United States Patent
Chen et al.

(10) Patent No.: US 10,433,343 B2
(45) Date of Patent: Oct. 1, 2019

(54) METHOD AND APPARATUS FOR IMPROVING RANDOM ACCESS PROCEDURE IN A WIRELESS COMMUNICATION SYSTEM

(71) Applicant: ASUSTek Computer Inc., Taipei (TW)

(72) Inventors: Wei-Yu Chen, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 53 days.

(21) Appl. No.: 15/663,662

(22) Filed: Jul. 28, 2017

(65) Prior Publication Data

US 2018/0035469 A1 Feb. 1, 2018

Related U.S. Application Data

(60) Provisional application No. 62/367,765, filed on Jul. 28, 2016, provisional application No. 62/367,897, filed on Jul. 28, 2016, provisional application No. 62/367,967, filed on Jul. 28, 2016.

(51) Int. Cl.
*H04W 74/08* (2009.01)
*H04W 72/10* (2009.01)
*H04W 74/00* (2009.01)

(52) U.S. Cl.
CPC ....... *H04W 74/0833* (2013.01); *H04W 72/10* (2013.01); *H04W 74/002* (2013.01)

(58) Field of Classification Search
CPC ............... H04W 72/10; H04W 74/002; H04W 74/0833
See application file for complete search history.

(56) References Cited

U.S. PATENT DOCUMENTS

| 8,411,664 B2 | 4/2013 | Tynderfeldt et al. |
| 2012/0051297 A1* | 3/2012 | Lee ..................... H04W 74/006 370/329 |

(Continued)

FOREIGN PATENT DOCUMENTS

| EP | 2797378 | 10/2014 |
| WO | 2012034278 | 3/2012 |

(Continued)

OTHER PUBLICATIONS

European search report from corresponding EP Application No. 17183817.0, dated Feb. 15, 2018.

*Primary Examiner* — Kashif Siddiqui
(74) *Attorney, Agent, or Firm* — Blue Capital Law Frim, P.C.

(57) ABSTRACT

A method and apparatus are disclosed, from the perspective of the UE, for performing random access procedure. In one embodiment, the method includes the UE receives a first back-off information from the network in a broadcast message, wherein the first back-off information includes a start offset of back-off interval. The method further includes the UE transmits a first preamble to the network. In addition, the method includes the UE determines a back-off interval based on the first back-off information and a second back-off information, wherein the second back-off information is received when the UE monitors a response for the first preamble. The method also includes the UE transmits a second preamble to the network after the back-off interval is finished.

21 Claims, 22 Drawing Sheets

(56) References Cited

U.S. PATENT DOCUMENTS

| | | | |
|---|---|---|---|
| 2013/0034059 A1* | 2/2013 | Lee | H04W 74/006 |
| | | | 370/328 |
| 2013/0208668 A1 | 8/2013 | Ramos | |
| 2014/0341155 A1 | 11/2014 | He | |
| 2015/0110076 A1 | 4/2015 | Yang et al. | |
| 2015/0230267 A1* | 8/2015 | Lee | H04W 74/0875 |
| | | | 370/336 |
| 2016/0192389 A1 | 6/2016 | Li et al. | |
| 2016/0323917 A1 | 11/2016 | Hwang et al. | |

FOREIGN PATENT DOCUMENTS

| | | |
|---|---|---|
| WO | 2012058975 | 5/2012 |
| WO | 2013077622 | 5/2013 |
| WO | 2014110805 | 7/2014 |

\* cited by examiner

METHOD AND APPARATUS FOR IMPROVING RANDOM ACCESS PROCEDURE IN A WIRELESS COMMUNICATION SYSTEM

CROSS-REFERENCE TO RELATED APPLICATIONS

The present application claims the benefit of U.S. Provisional Patent Application Ser. Nos. 62/367,765, 62/367,897, and 62/367,967 filed on Jul. 28, 2016, the entire disclosures of which are incorporated herein in their entirety by reference.

FIELD

This disclosure generally relates to wireless communication networks, and more particularly, to a method and apparatus for improving random access procedure in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed, from the perspective of the UE (User Equipment), for performing random access procedure. In one embodiment, the method includes the UE receives a first back-off information from the network in a broadcast message, wherein the first back-off information includes a start offset of back-off interval. The method further includes the UE transmits a first preamble to the network. In addition, the method includes the UE determines a back-off interval based on the first back-off information and a second back-off information, wherein the second back-off information is received when the UE monitors a response for the first preamble. The method also includes the UE transmits a second preamble to the network after the back-off interval is finished.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: TR 38.913 v0.3.0, "Study on Scenarios and Requirements for Next Generation Access Technologies"; TS 36.300 v13.2.0, "Overall Description; Stage 2"; TS 36.913, v13.0.0, "Requirements for further advancements for Evolved Universal Terrestrial Radio Access (E-UTRA)"; TS 36.331 v13.2.0, "Radio Resource Control (RRC); Protocol specification"; TS 36.321 v13.1.0, "Medium Access Control (MAC) protocol specification"; and R2-163445, "Scheduling Framework and Requirements", Nokia and Alcatel-Lucent Shanghai Bell. The standards and documents listed above are hereby expressly incorporated by reference in their entirety.

Figure 1:
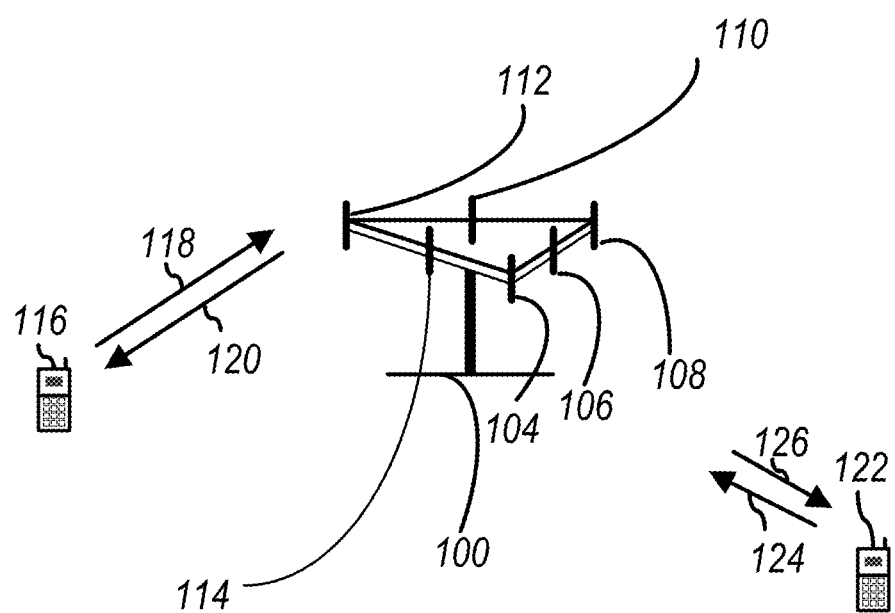
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
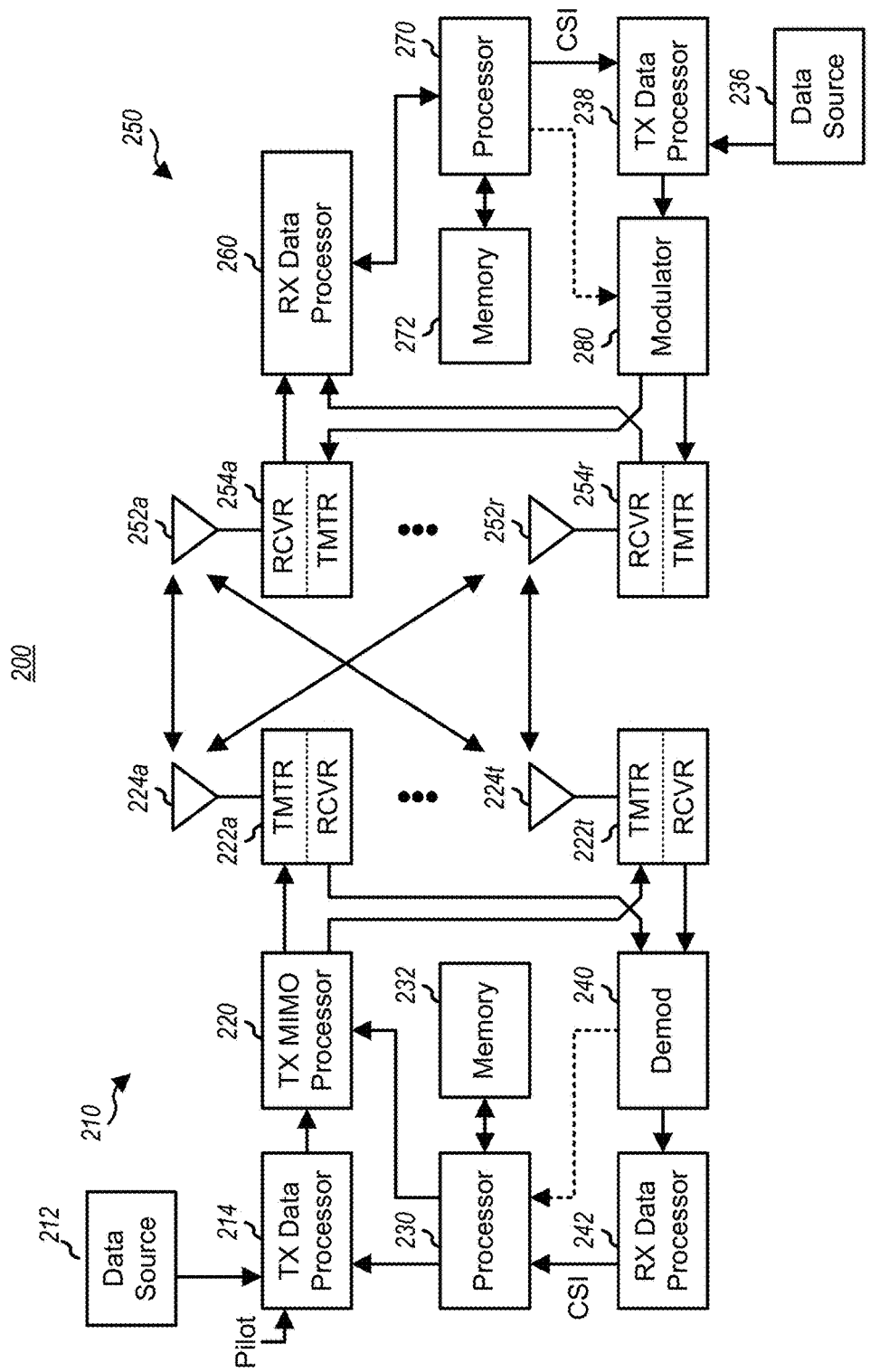
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
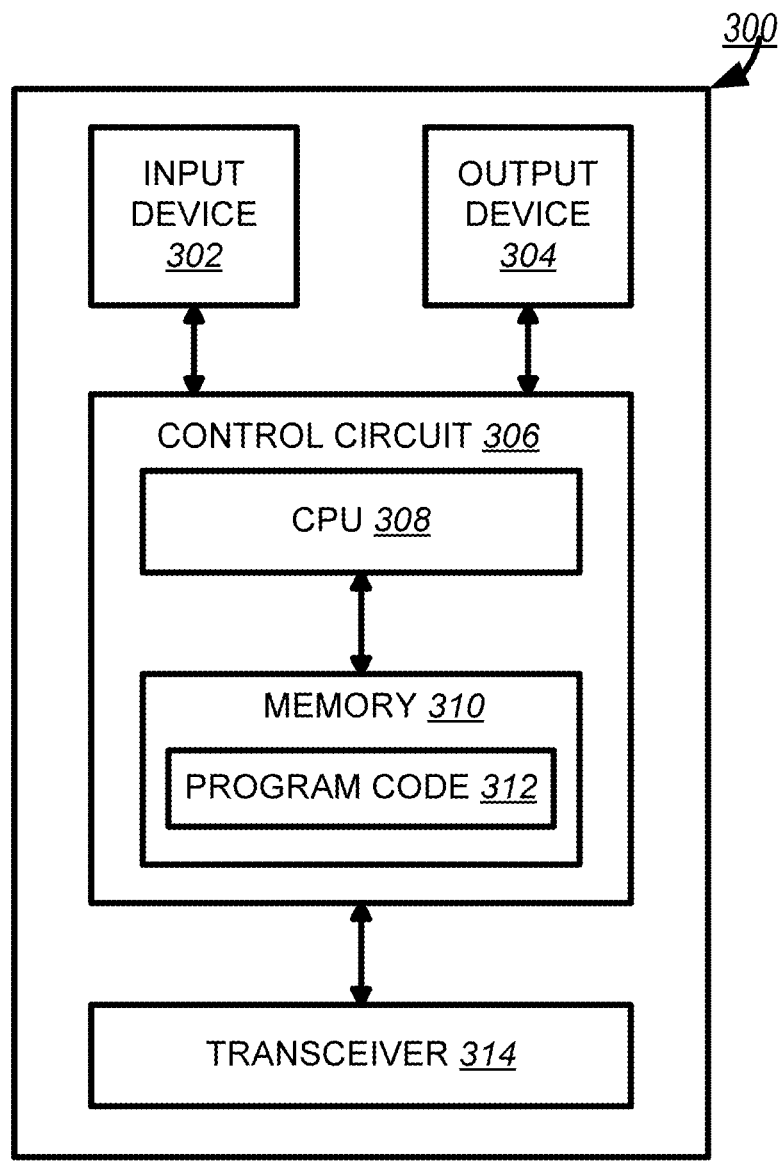
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
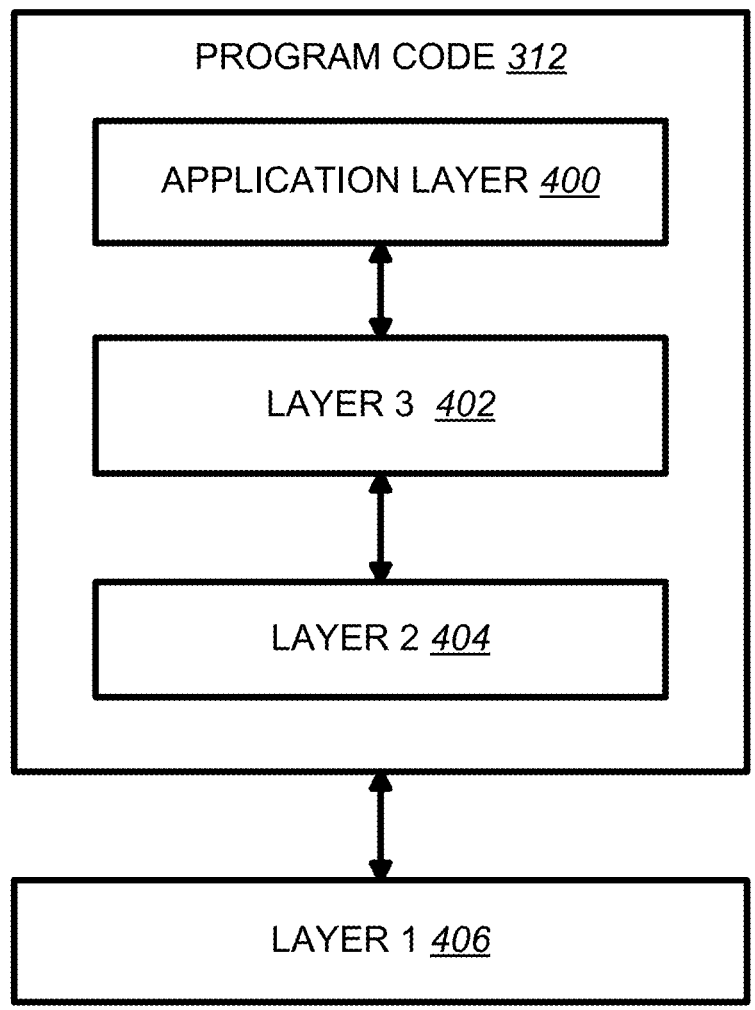
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.300 provides the following description for Random Access (RA) procedure:

10.1.5 Random Access Procedure

The random access procedure is characterized by:
Common procedure for FDD and TDD;
One procedure irrespective of cell size and the number of serving cells when CA is configured;
The random access procedure is performed for the following events related to the PCell:
Initial access from RRC_IDLE;
RRC Connection Re-establishment procedure;
Handover;
DL data arrival during RRC_CONNECTED requiring random access procedure:
E.g. when UL synchronisation status is "non-synchronised".
UL data arrival during RRC_CONNECTED requiring random access procedure:
E.g. when UL synchronisation status is "non-synchronised" or there are no PUCCH resources for SR available.
For positioning purpose during RRC_CONNECTED requiring random access procedure;
E.g. when timing advance is needed for UE positioning.
The random access procedure is also performed on a SCell to establish time alignment for the corresponding STAG.
In DC, the random access procedure is also performed on at least PSCell upon SCG addition/modification, if instructed, or upon DL/UL data arrival during RRC_CONNECTED requiring random access procedure. The UE initiated random access procedure is performed only on PSCell for SCG.
Furthermore, the random access procedure takes two distinct forms:
Contention based (applicable to first five events);
Non-contention based (applicable to only handover, DL data arrival, positioning and obtaining timing advance alignment for a sTAG).

Normal DL/UL transmission can take place after the random access procedure.

An RN supports both contention-based and non-contention-based random access. When an RN performs the random access procedure, it suspends any current RN subframe configuration, meaning it temporarily disregards the RN subframe configuration. The RN subframe configuration is resumed at successful random access procedure completion.

10.1.5.1 Contention Based Random Access Procedure

Figure 5:
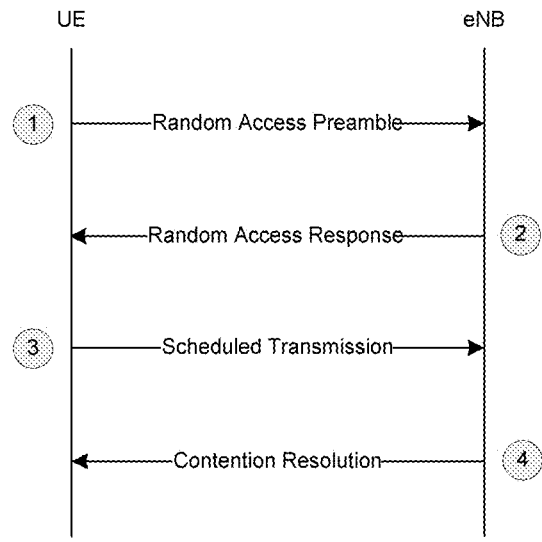
FIG. 5 is a reproduction of Figure 10.1.5.1-1 of 3GPP TS 36.300 v13.2.0.
Figure 10:
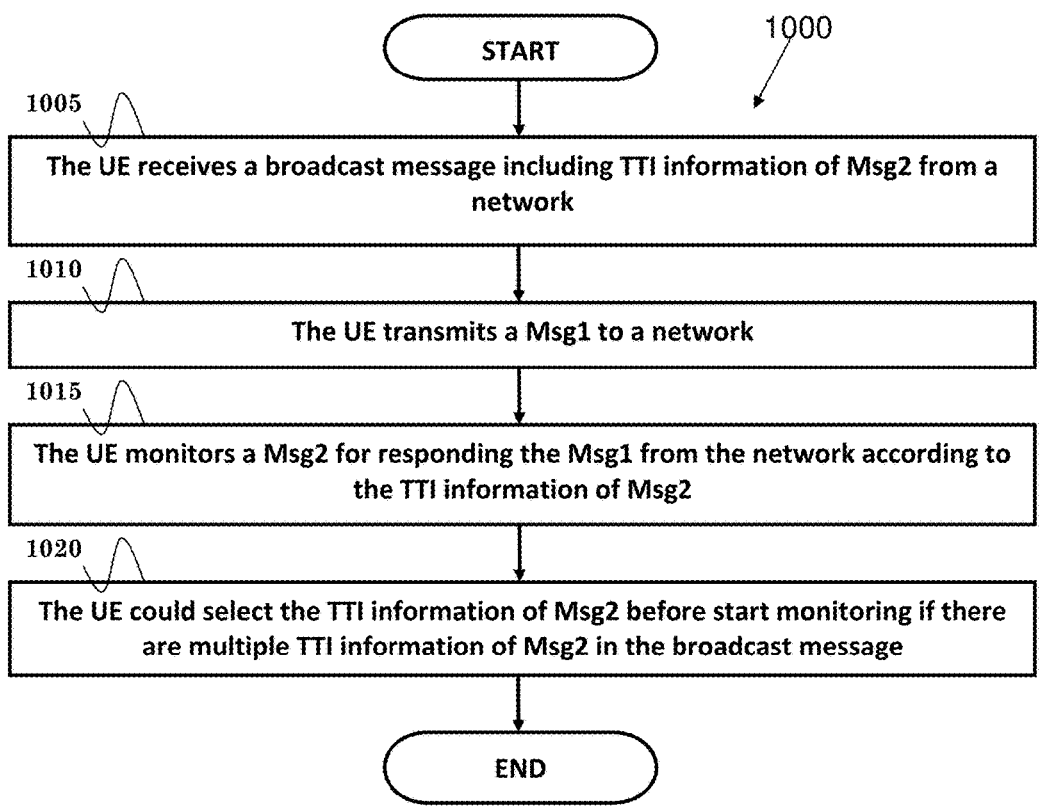
FIG. 10 is a flow chart according to one exemplary embodiment.

The contention based random access procedure is outlined on Figure 10.1.5.1-1 below:

Figure 10.1.5.1-1 of 3GPP TS 36.300 v13.2.0, Entitled "Contention Based Random Access Procedure", is Reproduced as FIG. 5

The four steps of the contention based random access procedures are:

1) Random Access Preamble on RACH in uplink:
    There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.

2) Random Access Response generated by MAC on DL-SCH:
    Semi-synchronous (within a flexible window of which the size is one or more TTI) with message 1;
    No HARQ;
    Addressed to RA-RNTI on PDCCH;
    Conveys at least RA-preamble identifier, Timing Alignment information for the pTAG, initial UL grant and assignment of Temporary C-RNTI (which may or may not be made permanent upon Contention Resolution);
    Intended for a variable number of UEs in one DL-SCH message.

3) First scheduled UL transmission on UL-SCH:
    Uses HARQ;
    Size of the transport blocks depends on the UL grant conveyed in step 2.
    For initial access:
        Conveys the RRC Connection Request generated by the RRC layer and transmitted via CCCH;
        Conveys at least NAS UE identifier but no NAS message;
        RLC TM: no segmentation.
    For RRC Connection Re-establishment procedure:
        Conveys the RRC Connection Re-establishment Request generated by the RRC layer and transmitted via CCCH;
        RLC TM: no segmentation;
        Does not contain any NAS message.
    After handover, in the target cell:
        Conveys the ciphered and integrity protected RRC Handover Confirm generated by the RRC layer and transmitted via DCCH;
        Conveys the C-RNTI of the UE (which was allocated via the Handover Command);
        Includes an uplink Buffer Status Report when possible.

For other events:
Conveys at least the C-RNTI of the UE.
4) Contention Resolution on DL:
Early contention resolution shall be used i.e. eNB does not wait for NAS reply before resolving contention;
Not synchronised with message 3;
HARQ is supported;
Addressed to:
The Temporary C-RNTI on PDCCH for initial access and after radio link failure;
The C-RNTI on PDCCH for UE in RRC_CONNECTED.
HARQ feedback is transmitted only by the UE which detects its own UE identity, as provided in message 3, echoed in the Contention Resolution message;
For initial access and RRC Connection Re-establishment procedure, no segmentation is used (RLC-TM).
The Temporary C-RNTI is promoted to C-RNTI for a UE which detects RA success and does not already have a C-RNTI; it is dropped by others. A UE which detects RA success and already has a C-RNTI, resumes using its C-RNTI.

When CA is configured, the first three steps of the contention based random access procedures occur on the PCell while contention resolution (step 4) can be cross-scheduled by the PCell.

When DC is configured, the first three steps of the contention based random access procedures occur on the PCell in MCG and PSCell in SCG. When CA is configured in SCG, the first three steps of the contention based random access procedures occur on the PSCell while contention resolution (step 4) can be cross-scheduled by the PSCell.

10.1.5.2 Non-Contention Based Random Access Procedure

Figure 6:
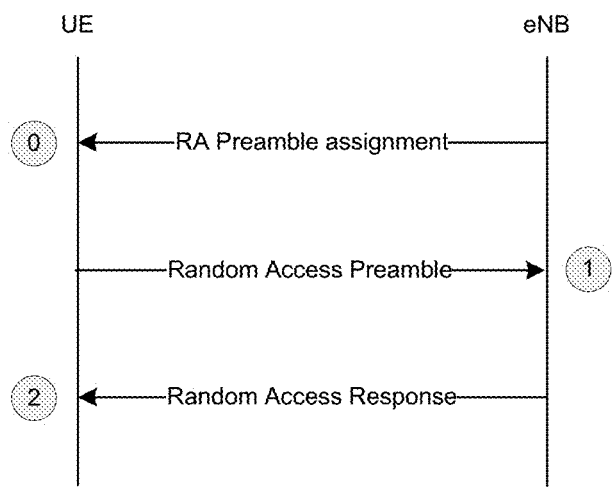
FIG. 6 is a reproduction of Figure 10.1.5.2-1 of 3GPP TS 36.300 v13.2.0.

The non-contention based random access procedure is outlined on Figure 10.1.5.2-1 below:

Figure 10.1.5.2-1 of 3GPP TS 36.300 v13.2.0, Entitled "Non-Contention Based Random Access Procedure", is Reproduced as FIG. 6

The three steps of the non-contention based random access procedures are:
0) Random Access Preamble assignment via dedicated signalling in DL:
   eNB assigns to UE a non-contention Random Access Preamble (a Random Access Preamble not within the set sent in broadcast signalling).
   Signalled via:
      HO command generated by target eNB and sent via source eNB for handover;
      PDCCH in case of DL data arrival or positioning;
      PDCCH for initial UL time alignment for a STAG.
1) Random Access Preamble on RACH in uplink:
   UE transmits the assigned non-contention Random Access Preamble.
2) Random Access Response on DL-SCH:
   Semi-synchronous (within a flexible window of which the size is two or more TTIs) with message 1;
   No HARQ;
   Addressed to RA-RNTI on PDCCH;
   Conveys at least:
      Timing Alignment information and initial UL grant for handover;
      Timing Alignment information for DL data arrival;
      RA-preamble identifier;
      Intended for one or multiple UEs in one DL-SCH message.

When performing non-contention based random access on the PCell while CA is configured, the Random Access Preamble assignment via PDCCH of step 0, step 1 and 2 of the non-contention based random access procedure occur on the PCell. In order to establish timing advance for a sTAG, the eNB may initiate a non-contention based random access procedure with a PDCCH order (step 0) that is sent on a scheduling cell of activated SCell of the sTAG. Preamble transmission (step 1) is on the indicated SCell and Random Access Response (step 2) takes place on PCell.

When performing non-contention based random access on the PCell or PSCell while DC is configured, the Random Access Preamble assignment via PDCCH of step 0, step 1 and 2 of the non-contention based random access procedure occur on the corresponding cell. In order to establish timing advance for a sTAG, the eNB may initiate a non-contention based random access procedure with a PDCCH order (step 0) that is sent on a scheduling cell of activated SCell of the sTAG not including PSCell. Preamble transmission (step 1) is on the indicated SCell and Random Access Response (step 2) takes place on PCell for MCG and PSCell for SCG.

Details of each random access steps and related control element are described in Sections 5.1, 5.4, 6, and 7 of 3GPP TS 36.321. Furthermore, some configurations for random access and obtaining procedure are captured in 3GPP TS 36.331.

"Control plane latency refers to the time to move from a battery efficient state (e.g., IDLE) to start of continuous data transfer (e.g., ACTIVE). The target for control plane latency should be 10 ms." is one NR requirement listed in 3GPP TR 38.913. Regarding similar requirement in LTE, the control plane latency requirement is set to 50 ms (as discussed in 3GPP TS 36.913). There is a huge gap between latency requirement of LTE and latency requirement of NR. Therefore, it would be better to reduce possible transmission and processing latency as much as possible. First, the focus on random access latency is discussed below.

In LTE, there are two kinds of random access procedure, contention and non-contention. In contention random access procedure, it consists of 4 steps, Msg1, Msg2, Msg3, and Msg4. FIG. 5 is an exemplary embodiment for the contention random access. As show in FIG. 5, Msg1 and Msg3 are transmitted from UE to network. And the resources for performing Msg1 transmission and Msg3 transmission are contention resources. If network can successfully receive a Msg3, network will identify a UE based on contents in Msg3 and will transmit a Msg4 to the UE for finishing the contention.

On the other hand, a dynamic TTI (Transmission Time Interval) adjusting concept is discussed in 3GPP R2-163445. In general, 3GPP R2-163445 proposes to set TTI size per scheduling grant for optimizing TCP (Transmission Control Protocol) transmission case. More concretely, short TTI can be used to accelerate TCP slow start process and long TTI can be used in steady transmission rate state for reduce control signaling overhead.

Considering such dynamic TTI concept, the present application discusses whether such dynamic TTI concept can also be used to accelerate random access procedure and how to achieve dynamic TTI change in random access. The following mainly focuses on the Msg2 transmission step in a random access procedure.

In addition, the discussion below does not include UE's RF (Radio Frequency)/Baseband capability differentiation case (e.g., differentiation between normal cell phone in LTE and NB-IoT (Narrowband Internet of Thing) devices in LTE). In LTE, there could be three different random access configurations in LTE system. The first one is for normal UE with enough RF/Baseband capability can monitor whole system bandwidth (e.g., cell phone, high end MTC (Machine Type Communication) device). The second one is for low-end MTC devices and normal UE with enough RF/Baseband capability but works in power limited condition. The third one is for NB-IoT UE which is pool RF/Baseband capability and can only perform transmission/reception on a narrow band (e.g., 1.4 MHz). And the last one is defined as a new RAT (Radio Access Technology).

Normally, low-end MTC devices will only work on the second one, and NB-IoT device will work only on the third one. For normal UE with enough RF/Baseband capability, the UE will only change RA configuration when the UE enters power limited state (e.g., cell edge or even far away).

Figure 7:
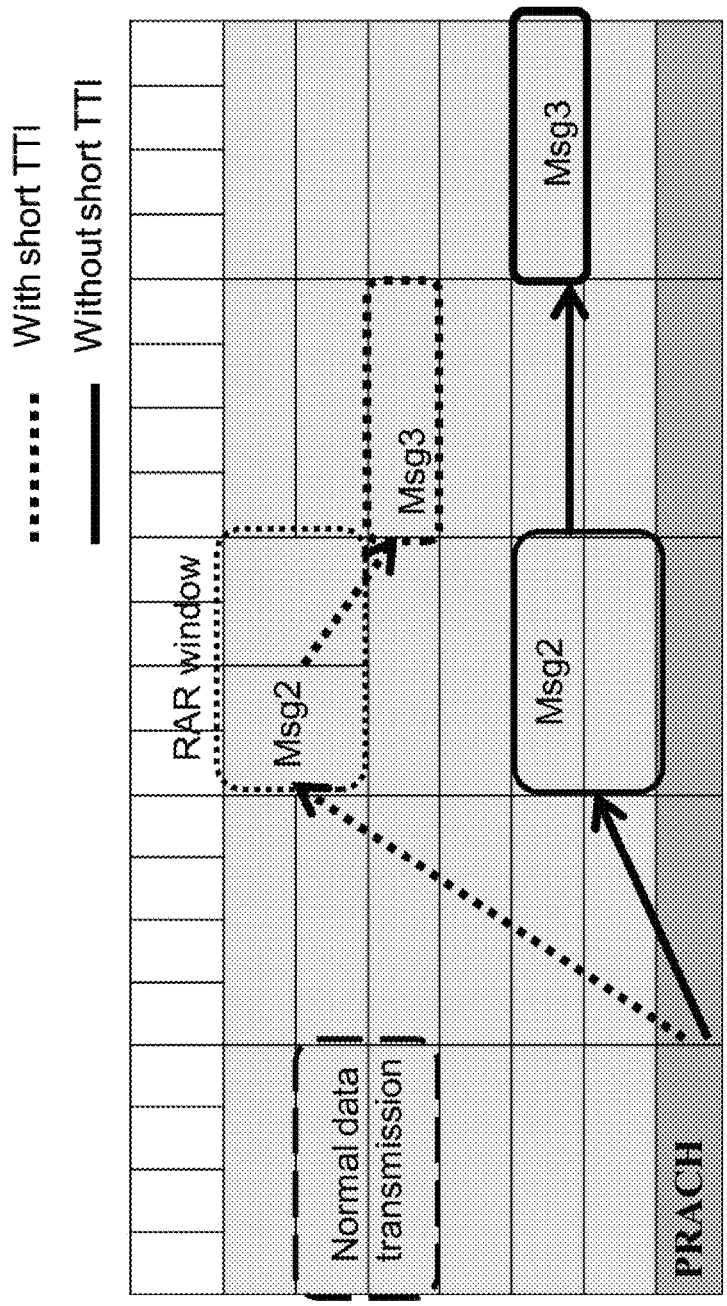
FIG. 7 is a diagram according to one exemplary embodiment.

If short TTI applies to Msg2 transmission, the average random access latency could be reduced due to early start to process of Msg2. A possible case for such benefit is shown in FIG. 7. In FIG. 7, although the minimum processing delay is a fixed period, the UE could start to transmit Msg3 earlier owing to early received Msg2.

To achieve the dynamic TTI concept, a UE will need to derive TTI information (e.g., TTI duration, numerology, . . . ) for receiving Msg2 on air interface. In this aspect, the present application generally proposes possible candidates for UE to obtain such information. And one or multiple solution can be applied in a NR (New RAT) system.

Solution 1: Broadcast Message —In Solution 1, a UE will derive TTI information for Msg2 transmission from network through broadcast message (e.g., system information(s), MIB, . . . ). If multiple TTI information for Msg2 transmission are included in the broadcast message, a UE will select one of them to apply to Msg2 transmission. In one embodiment, the UE selects TTI information in broadcast message based on its Msg1 transmission (e.g., preamble set in RA configuration used by Msg1, PRACH resource set in RA configuration used by Msg1, Msg1 length or format, RA configuration used by Msg1, etc.).

In one embodiment, the UE selects TTI information in broadcast message based on service types (e.g., URLLC (Ultra Reliable and Low Latency Communication), eMBB (enhanced Mobile Broadband), delay sensitive, . . . ). For example, if the UE triggers RA for transmitting a specific service type data (e.g., URLLC service type), then the UE will select TTI information in broadcast message for the specific service type.

Moreover, the UE may understand the data belonging to which service type based on a service type indication (similar to logical channel priority) in configuration of logical channel/RB having available data. The service type indication may be used in multiplexing procedure. For instance, the UE may not multiplex data with different service type indications into a TB for transmission. Alternatively, the UE may understand the data belonging to which service type based on header field of the data (e.g., RLC (Radio Link Control) header field, PDCP (Packet Data Convergence Protocol) field). Alternatively, the UE may understand the data belonging to which service type based on delivering user plane protocol type/category (e.g., category 1 maps to URLLC).

As another example, if the UE triggers RA when the UE has registered/authorized for URLLC service type, the UE will select TTI information in broadcast message for URLLC service type. As yet another example, if a higher layer (e.g., NAS (Non-Access Stratum) layer, application layer, RRC (Radio Resource Control) layer) in a UE sends a service indication to lower layer (e.g., MAC (Medium Access Control), PHY (Physical)) in the UE when the UE triggers and/or performs RA, the UE will select TTI information in broadcast message based on the service type indicated by the service indication.

In one embodiment, the UE selects TTI information in broadcast message based on random access purpose (e.g., request broadcast message, paging, positioning, location update, control plane establishment, handover, etc.). And the random access purpose may be indicated by higher layer (e.g., NAS, RRC, application layer) in the UE. In one embodiment, the UE selects TTI information in broadcast message based on potential Msg3 size. For example, if the pending available data in a UE larger than a threshold when a UE is performing RA, the UE selects TTI information in broadcast message for potential message size larger than the threshold.

In one embodiment, the UE selects TTI information in broadcast message based on its DL measurement. In one embodiment, the UE selects TTI information in broadcast message based on connection establishment cause (e.g., emergency call, mo-data, mt-data, . . . ). In one embodiment, the UE selects TTI information in broadcast message based on its current power ramping result. In one embodiment, the UE selects TTI information in broadcast message based on UE priority provided from network or UE subscription.

In one embodiment, the UE selects TTI information in broadcast message based on Msg3 contents (e.g., which type control element will be included, BSR (Buffer Status Report) reporting for which LCG (Logical Channel Group) or which RB (Radio Bearer)/LC, data from which user plane protocol stock, data from which radio bearer, data from which logical channel, . . . ). For example, if Msg3 includes data from a specific (set of) LC or RB (e.g., URLLC type RB, CCCH (Common Control Channel), . . . ), the UE will select TTI information in broadcast message related to the LC or RB based on the UE's configuration. As another example, if Msg3 includes a special control element/special message, the UE will select TTI information in broadcast message related to the special control element/message.

In one embodiment, the UE selects TTI information in broadcast message based on highest priority of radio bearers/logical channels having available data. For example, the UE has available data belonging to a radio bearer/logical channel with priority 2 and priority 8 when the UE is performing RA. UE will select TTI information in broadcast message based on whether priority 2 is over a threshold or not.

In one embodiment, the UE selects TTI information in broadcast message based on highest priority of logical channels having available data. In one embodiment, the UE selects TTI information in broadcast message based on which user plane protocol stock (e.g., URLLC or eMBB type user plane protocol, protocol stock category/index 1 or 2, . . . ) performing the random access.

Solution 2: UE Specific—In Solution 2, a UE will derive TTI information for Msg2 transmission from network through dedicated message (e.g. RRC reconfiguration message, paging message, PDCCH for initiating RA, . . . ). If multiple TTI information for Msg2 transmission are included in the dedicated message or are derived based on both the dedicated message and a broadcast message, a UE will select one of them to apply to the Msg2 transmission.

In one embodiment, the UE selects TTI information in dedicated message based on its Msg1 transmission (e.g., preamble set in RA configuration used by Msg1, PRACH resource set in RA configuration used by Msg1, Msg1 length or format, RA configuration used by Msg1, etc.). In one embodiment, the UE selects TTI information in dedicated message based on service types (e.g., URLLC, eMBB, delay sensitive, . . . ).

For example, if the UE triggers RA for transmitting a specific service type data (e.g. URLLC service type), then the UE will select TTI information in dedicated message for the specific service type. Moreover, the UE may understand the data belonging to which service type based on a service type indication (similar to logical channel priority) in configuration of a logical channel/RB having data available for transmission. The service type indication may be used in multiplexing procedure. For instance, the UE may not multiplex data with different service type indications into a TB for transmission. Alternatively, the UE may understand the data belonging to which service type based on header field of the data (e.g., RLC (Radio Link Control) header field, PDCP (Packet Data Convergence Protocol) field). Alternatively, the UE may understand the data belonging to which service type based on delivering user plane protocol type/category (e.g., category 1 maps to URLLC).

As another example, if the UE triggers RA when the UE has registered/authorized for URLLC service type, the UE will select TTI information in dedicated message for URLLC service type. As yet another example, if higher layer (e.g. NAS layer, application layer, RRC layer) in a UE sends a service indication to lower layer (e.g. MAC, PHY) in the UE when the UE triggers and/or performs RA, the UE will select TTI information in dedicated message based on the service type indicated by the service indication.

In one embodiment, the UE selects TTI information in dedicated message based on random access purpose (e.g., request system information, paging, positioning, location update, control plane establishment, handover, etc.). And the random access purpose may be indicated by higher layer (e.g., NAS, RRC, application layer) in the UE.

In one embodiment, the UE selects TTI information in dedicated message based on potential Msg3 size. For example, if the pending data available for transmission in a UE larger than a threshold when a UE is performing RA, the UE selects TTI information in dedicated message for potential message size larger than a threshold.

In one embodiment, the UE selects TTI information in dedicated message based on its DL measurement. In one embodiment, the UE selects TTI information in dedicated message based on connection establishment cause (e.g., emergency call, mo-data, mt-data, . . . ). In one embodiment, the UE selects TTI information in dedicated message based on its current power ramping result. In one embodiment, the UE selects TTI information in dedicated message based on UE priority provided from network or UE subscription.

In one embodiment, the UE selects TTI information in dedicated message based on Msg3 contents (e.g., which type control element will be included, BSR reporting for which LCG or which RB/LC, data from which user plane protocol stock, data from which radio bearer, data from which logical channel, . . . ). For example, if Msg3 includes data from a specific (set of) LC or RB (e.g. URLLC type RB, CCCH, . . . ), the UE will select TTI information in dedicated message related to the LC or RB based on the UE's configuration. As another example, if Msg3 includes a special control element/special message, the UE will select TTI information in dedicated message related to the special control element/message.

In one embodiment, the UE selects TTI information in dedicated message based on highest priority of radio bearers having data available for transmission. For example, the UE has data available for transmission belonging to radio bearer with priority 2 and priority 8 when the UE is performing RA. The UE will select TTI information in dedicated message based on whether priority 2 is over a threshold or not.

In one embodiment, the UE selects TTI information in dedicated message based on highest priority of logical channels having data available for transmission. In one embodiment, the UE selects TTI information in dedicated message based on which user plane protocol stock (e.g., URLLC or eMBB type user plane protocol, protocol stock category/index 1 or 2, . . . ) performing the random access.

Solution 3: Control Signal for Scheduling Msg2—In Solution 3, a UE will derive TTI information for Msg2 transmission from network through a control signal for scheduling Msg2. In one embodiment, the control signal addressed to a contention identifier (e.g. RA-RNTI (Random Access Radio Network Temporary Identifier) may include a field including TTI information.

In one embodiment, the UE derives the TTI information according to which physical channel used to transmit the control signal addressed to a contention identifier. In one embodiment, the UE derives the TTI information according to format of the control signal. In one embodiment, the UE derives the TTI information according to which contention identifier the control signal addressed to. In one embodiment, the UE derives the TTI information according to the control signal is transmitted on which frequency resource.

Solution 4: Derive from Msg1 Transmission—In Solution 4, a UE will derive TTI information for Msg2 transmission based on Msg1 transmission. In one embodiment, a UE derives TTI information based on TTI information used by Msg1. The TTI of Msg2 transmission may be N times of TTI of Msg1. N value can be integer or decimal. The N value may be obtained by a UE based on one or multiple solutions mentioned above. For example, the UE may obtain the N value through broadcast message from a network. And the UE will overwrite the N value provided in broadcast message, if the UE receives another N value in a dedicated message.

In another embodiment, a UE derives TTI information based on frequency carrier used by Msg1. Each frequency carrier may have corresponding different TTI information. The corresponding TTI information may be predefined and/or provided through system information and/or dedicated RRC message.

In another embodiment, a UE derives TTI information based on which preamble set or which preamble format used by Msg1. The corresponding TTI information may be predefined and/or provided through system information and/or dedicated RRC message.

Figure 8:
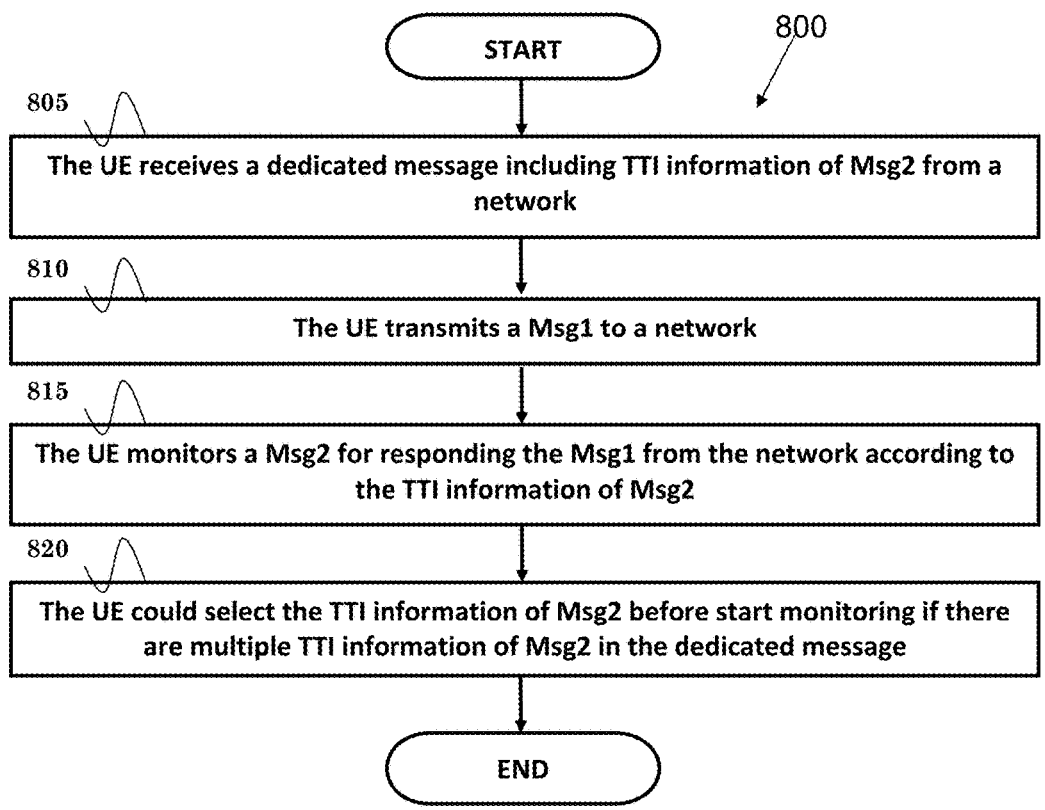
FIG. 8 is a flow chart according to one exemplary embodiment.

FIG. 8 is a flow chart 800 according to one exemplary embodiment from the perspective of a UE. In step 805, the UE receives a dedicated message including a TTI of Msg2 from a network. In step 810, the UE transmits a Msg1 to a network. In one embodiment, the Msg1 could be a preamble or a PRACH transmission. In step 815, the UE monitors a Msg2 for responding the Msg1 from the network according to the TTI information of Msg2. In step 820, the UE could select the TTI information of Msg2 before start monitoring if there are multiple TTI information of Msg2 in the dedicated message.

Referring back to FIGS. 3 and 4, in one exemplary embodiment of a UE, the device 300 includes a program code 312 stored in the memory 310. The CPU 308 could execute program code 312 to enable the UE (i) to receive a dedicated message including a TTI information of Msg2 from a network, (ii) to transmit a Msg1 to a network, (iii) to monitor a Msg2 for responding the Msg1 from the network according to the TTI information of Msg2, and (iv) to select the TTI information of Msg2 before start monitoring if there are multiple TTI information of Msg2 in the dedicated message. Furthermore, the CPU 308 can execute the program code 312 to perform all of the above-described actions and steps or others described herein.

Figure 9:
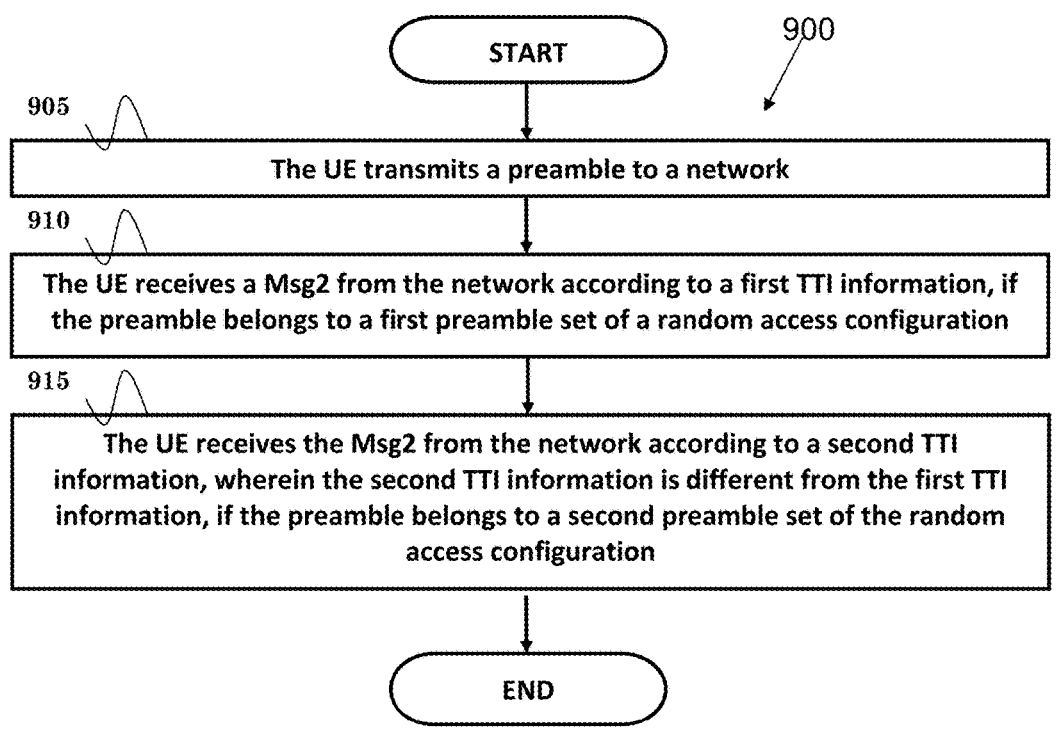
FIG. 9 is a flow chart according to one exemplary embodiment.

FIG. 9 is a flow chart 900 according to one exemplary embodiment from the perspective of a UE. In step 905, the UE transmits a preamble to a network. In step 910, the UE receives a Msg2 from the network according to a first TTI information, if the preamble belongs to a first preamble set of a random access configuration. In step 915, the UE receives the Msg2 from the network according to a second TTI information, wherein the second TTI information is different from the first TTI information, if the preamble belongs to a second preamble set of the random access configuration.

Referring back to FIGS. 3 and 4, in one exemplary embodiment of a UE, the device 300 includes a program code 312 stored in the memory 310. The CPU 308 could execute program code 312 to enable the UE (i) to transmit a preamble to a network, (ii) to receive a Msg2 from the network according to a first TTI information, if the preamble belongs to a first preamble set of a random access configuration, and (iii) to receive the Msg2 from the network according to a second TTI information, wherein the second TTI information is different from the first TTI information, if the preamble belongs to a second preamble set of the random access configuration. Furthermore, the CPU 308 can execute the program code 312 to perform all of the above-described actions and steps or others described herein.

FIG. 10 is a flow chart 1000 according to one exemplary embodiment from the perspective of a UE. In step 1005, the UE receives a broadcast message including TTI information of Msg2 from a network. In step 1010, the UE transmits a Msg1 to a network. In one embodiment, the Msg1 could be a preamble or a PRACH transmission. In step 1015, the UE monitors a Msg2 for responding the Msg1 from the network according to the TTI information of Msg2. In step 1020, the UE could select the TTI information of Msg2 before start monitoring if there are multiple TTI information of Msg2 in the broadcast message.

Referring back to FIGS. 3 and 4, in one exemplary embodiment of a . . . , the device 300 includes a program code 312 stored in the memory 310. The CPU 308 could execute program code 312 to enable the UE (i) to receive a broadcast message including TTI information of Msg2 from a network, (ii) to transmit a Msg1 to a network, (iii) to monitor a Msg2 for responding the Msg1 from the network according to the TTI information of Msg2, and (iv) to select the TTI information of Msg2 before start monitoring if there are multiple TTI information of Msg2 in the broadcast message. Furthermore, the CPU 308 can execute the program code 312 to perform all of the above-described actions and steps or others described herein.

Figure 11:
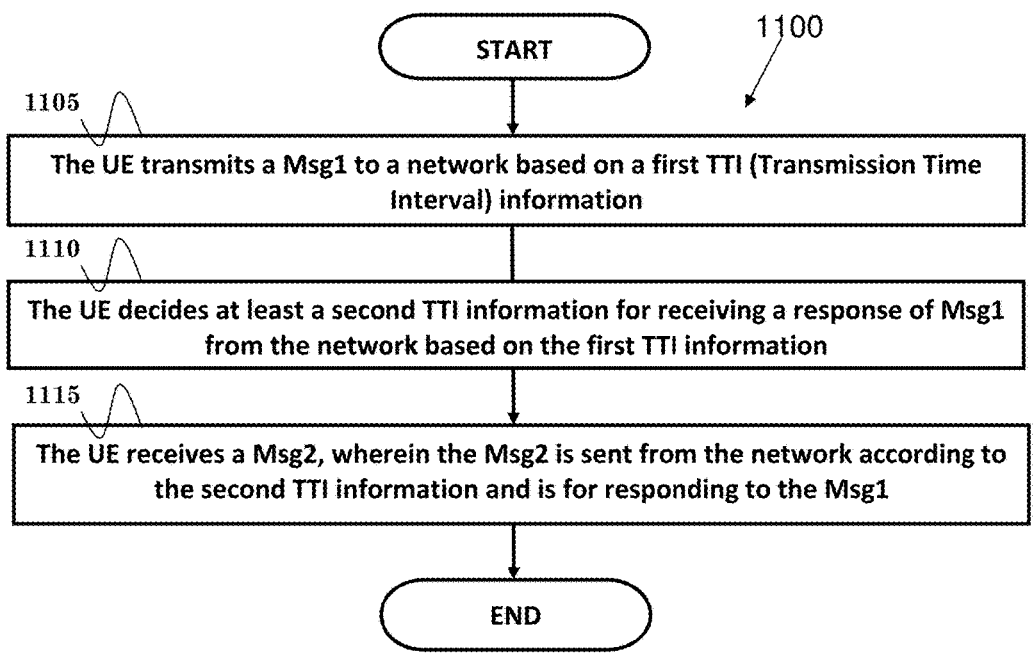
FIG. 11 is a flow chart according to one exemplary embodiment.

FIG. 11 is a flow chart 1100 according to one exemplary embodiment from the perspective of a UE. In step 1105, the UE transmits a Msg1 to a network based on a first TTI information. In step 1110, the UE decides at least a second TTI information for receiving a response of Msg1 from the network based on the first TTI information. In step 1115, the UE receives a Msg2, wherein the Msg2 is sent from the network according to the second TTI information and is for responding to the Msg1.

In one embodiment, the first TTI information could be a first numerology or a first TTI duration. Furthermore, the second TTI information could be a second numerology or a second TTI duration.

Referring back to FIGS. 3 and 4, in one exemplary embodiment of a . . . , the device 300 includes a program code 312 stored in the memory 310. The CPU 308 could execute program code 312 to enable the UE (i) to transmit a Msg1 to a network based on a first TTI information, (ii) to decide at least a second TTI information for receiving a response of Msg1 from the network based on the first TTI information, and (iii) to receive a Msg2, wherein the Msg1 is sent from the network according to the second TTI information and is for responding to the Msg1. Furthermore, the CPU 308 can execute the program code 312 to perform all of the above-described actions and steps or others described herein.

Figure 12:
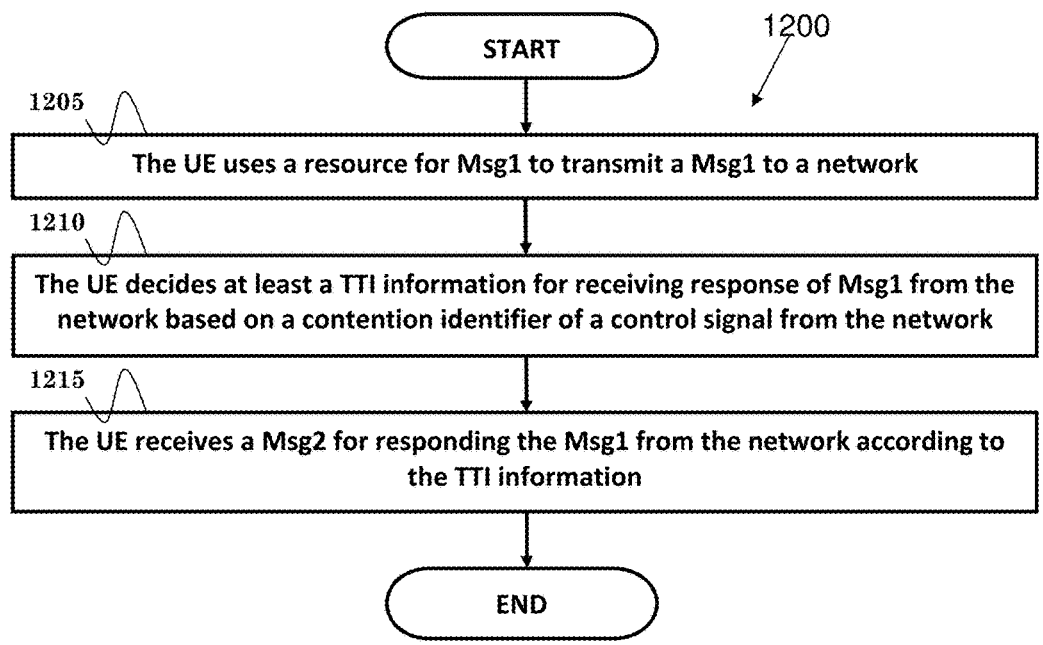
FIG. 12 is a flow chart according to one exemplary embodiment.

FIG. 12 is a flow chart 1200 according to one exemplary embodiment from the perspective of a UE. In step 1205, the UE uses a resource for Msg1 to transmit a Msg1 to a network. In step 1210, the UE decides at least a TTI information for receiving response of Msg1 from the network based on a contention identifier of a control signal from the network. In step 1215, the UE receives a Msg2 for responding the Msg1 from the network according to the TTI information.

Referring back to FIGS. 3 and 4, in one exemplary embodiment of a UE, the device 300 includes a program code 312 stored in the memory 310. The CPU 308 could execute program code 312 to enable the UE (i) to use a resource for Msg1 to transmit a Msg1 to a network, (ii) to decide at least a TTI information for receiving response of Msg1 from the network based on a contention identifier of a control signal from the network, and (iii) to receive a Msg2 for responding the Msg1 from the network according to the TTI information. Furthermore, the CPU 308 can execute the program code 312 to perform all of the above-described actions and steps or others described herein.

In addition, considering diverse possible requirements in NR system, the Msg1 resource may be partitioned into different sets. In following discussion, the present application uses different service types as an example.

Figure 22:
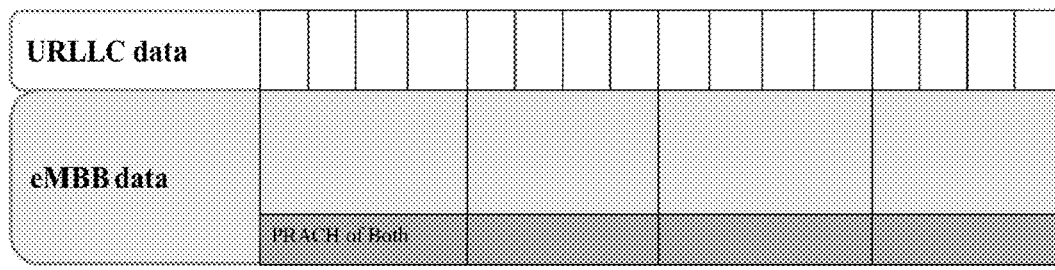
FIG. 22 is a diagram according to one exemplary embodiment.

For random access, radio resource (e.g., PRACH (Physical Random Access Channel) resource) for transmitting Msg1 may be the same or different for URLLC and eMBB. Moreover, regarding different cases, the Msg1 resource for URLLC and eMBB may be differentiable to a network in time domain and/or frequency domain and/or code domain (different preamble sequence set). Possible exemplary options and related possible exemplary cases are illustrated in FIGS. 22, 23, and 24, and are discussed in below.

Figure 23:
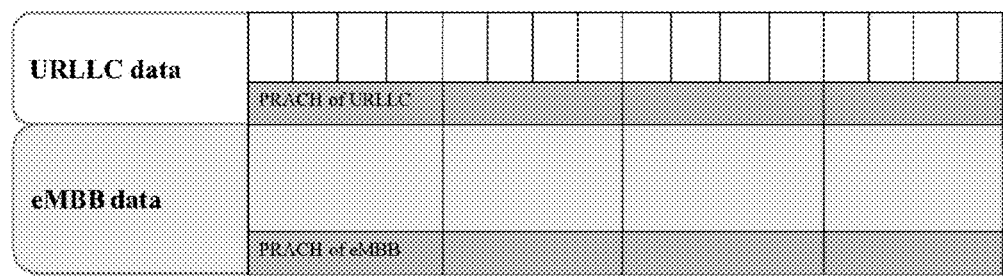
FIG. 23 is a diagram according to one exemplary embodiment.
Figure 24:
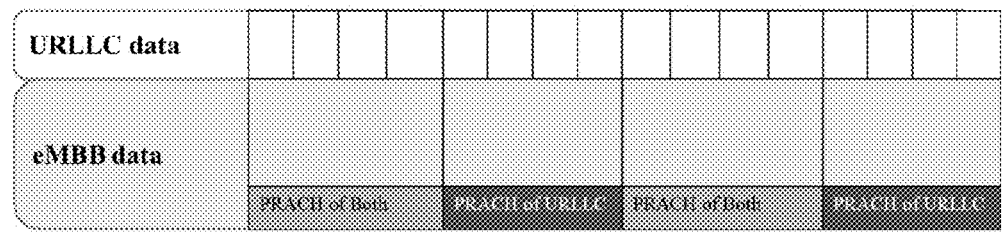
FIG. 24 is a diagram according to one exemplary embodiment.

Similar to exemplary designs illustrated in FIGS. 23 and 24, it can be assumed that network can differentiate different types of service (e.g., URLLC, eMBB, delay sensitive or not, RB ID, . . . ) and/or different random access purposes (e.g., triggered by URLLC services, emergency call, establishment cause, contention RA or not, . . . ) based on Msg1 transmission. More specifically, those different needs mentioned above can be mapped to different Msg1 resource sets divided in code domain and/or frequency domain and/or time domain. And the UE will also need to follow same rules to select the different Msg1 resource sets for performing Msg1 transmission.

Furthermore, the present application considers how to design RAR window mechanism for satisfying different latency requirements for different UEs. In addition, the discussion below does not include UE's RF/Baseband capability differentiation (e.g., differentiation between normal cell phone in LTE and NB-IoT devices in LTE) case.

In LTE, there could be three different random access configurations in LTE system. The first one is for normal UE with enough RF/Baseband capability can monitor whole system bandwidth (e.g. cell phone, high end MTC device). The second one is for low-end MTC devices and normal UEs with enough RF/Baseband capability but work in power limited condition. The third one is for NB-IoT UE which is pool RF/Baseband capability and can only perform transmission/reception on a narrow band (e.g., 1.4 MHz). And the last one is defined as a new RAT. Normally, low-end MTC devices will only work on the second one, and NB-IoT device will work only on the third one. For normal UEs with enough RF/Baseband capability, the UE will only change RA configuration when the UE enters power limited state (e.g., cell edge or even far away).

In LTE, the RAR (Random Access Response) window is an interval which possibly contains Msg2 transmission. After the UE transmits a Msg1 (e.g., preamble) to network, the UE will firstly wait a period for network's processing time and then enter RAR window for receiving expected Msg2. Regarding the RAR window length, a shorter RAR window will limit network's scheduling flexibility, while a longer RAR will increase latency and UE power consumption for blind decoding.

Considering the demands mentioned in issue part, we propose to provide different RAR window lengths and/or start timings of a RAR window for different Msg1 resource sets. By this way, network has flexibility to prioritize part of UEs with limited system burden. Possible examples are shown in FIGS. 13 and 14 for discriminated service type case.

Figure 13:
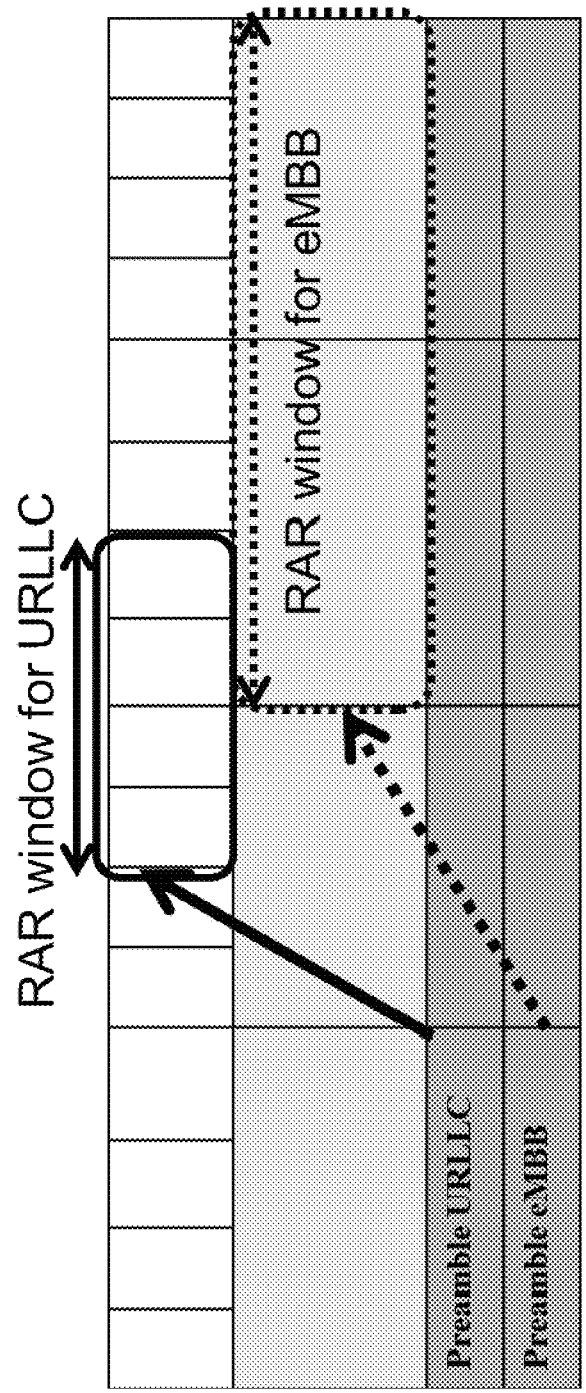
FIG. 13 is a diagram according to one exemplary embodiment.
Figure 14:
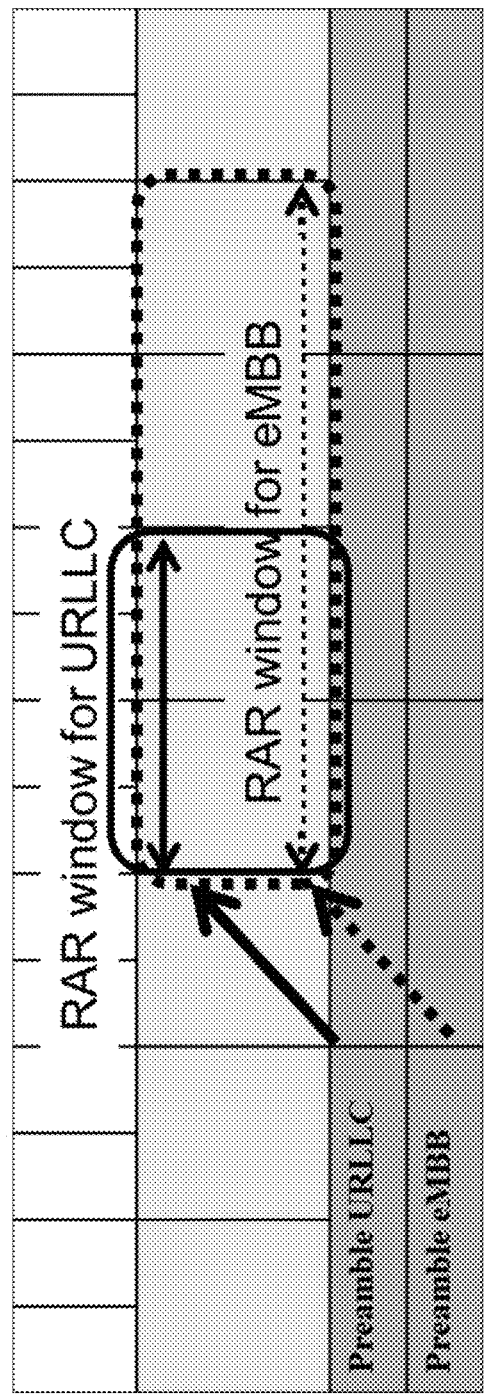
FIG. 14 is a diagram according to one exemplary embodiment.

In FIG. 13, the UE will need to monitor Msg2 in different numerologies based on Msg1 resource set it used. And the RAR window length and the RAR window start timing are different for different Msg1 resource sets. The RAR window for URLLC may be shorter and start earlier compared with the RAR window for eMBB. In FIG. 14, UEs using different Msg1 resource sets will monitor Msg2 on the same numerology. The RAR window start timing is set to the same value in this case. The shorter RAR window is applied to URLLC service type for making failed UE entering next round contention earlier. By this way, the possible random access latency for URLLC is reduced.

To achieve the proposal, the information about RAR window length and RAR window start timing will need to be known by UEs. The RAR window length and RAR window start timing can be provided in same or different ways. Moreover, different RAR window lengths and different RAR window start timings related to different Msg1 resource sets may be provided through different ways. Some possible ways are proposed below:

RAR window length—In one embodiment, the RAR window length is provided to UEs through a broadcast message. The broadcast message could be common system information. Possibly, the common system information may indicate different Msg1 resource sets and corresponding RAR window lengths. Furthermore, the common system information may use a value to indicate RAR window length. And the real RAR window length will need to multiply the value with a coefficient. The coefficient may be received from a network through a message (e.g. dedicated message, the common system information, broadcasted system information for specific service type and/or specific random access purpose, broadcasted system information for specific numerology, . . . ) or predefined or UE-self detected (e.g. UE detects based on reference signals from network and a defined table). By this way, network can provide different window lengths with one RAR window value.

Figure 15:
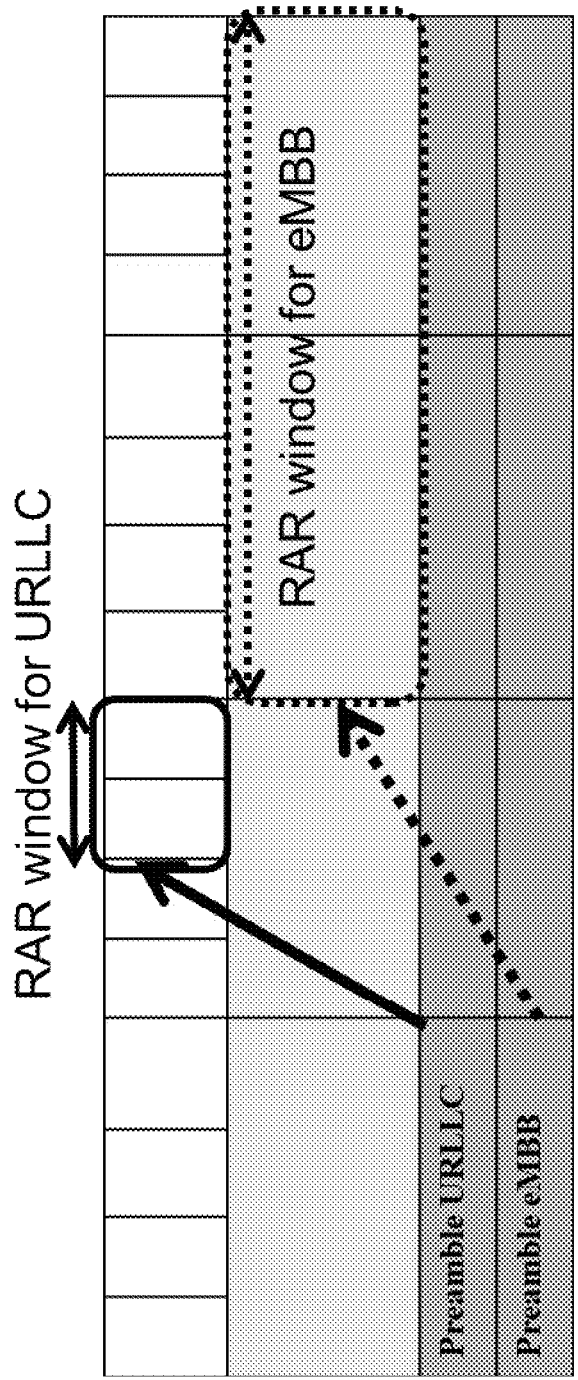
FIG. 15 is a diagram according to one exemplary embodiment.

A related example is shown in FIG. 15. In the example shown in FIG. 15, a network indicates window length is 2 TTIs. However, since numerologies for receiving Msg2 messages are different, the RAR window lengths will become different. Alternatively, the broadcast message could be a system information for specific service type and/or specific random access purpose as Msg1 discrimination mentioned in issue part or for any selection rule mentioned below.

In another embodiment, the RAR window length is provided to UE through a dedicated message (e.g., RRC reconfiguration message, paging message, PDCCH (Physical Downlink Control Channel) for initiating RA, . . . ). In one embodiment, the dedicated message is a configuration message. The dedicated message may be a response message to UE's request. In one embodiment, the configuration provided in dedicated message is used to overwrite configuration provided in broadcast message. Alternatively, the configuration provided in dedicated message provides more information without overwriting configuration provided in broadcast message.

In one embodiment, the configuration may contain Msg1 resource set(s). In one embodiment, the configuration may contain RAR window length(s). Possibly, the dedicated message may use a value to indicate RAR window length. And the real RAR window length will need to multiply the value with a coefficient. The coefficient may be received from a network through a message (e.g., the dedicated message, common system information, broadcasted system information for specific service type and/or specific random access purpose, broadcasted system information for specific numerology, . . . ) or predefined or UE-self detected (e.g., UE detects based on reference signals from network and a defined table).

In another embodiment, the RAR window length is decided based on interval between two Msg1 transmission opportunities which could use the same RA-RNTI. For example, the RA-RNTI could repeat after 10 ms in LTE. The RAR can be N times of 10 ms. N can be 1 or decimal. The N may be predefined and/or transmitted through system information and/or transmitted through dedicated message.

In another embodiment, the RAR window length is predefined in the specification. The specification will include different window length for different physical layer configuration (e.g., numerology, TTI length of Msg1, TTI length of Msg2, frequency carrier). As another example, different numerologies used for Msg2 transmission may have different RAR window lengths based on default configuration.

RAR window start timing—In one embodiment, the RAR window start timing is provided to UEs through a broadcast message. In one embodiment, the broadcast message is common system information. Possibly, the common system information may indicate different Msg1 resource sets and corresponding RAR window start timings. Furthermore, the common system information could use a value to indicate RAR window start timing. And the real RAR window start timing will need to multiply the value with a coefficient. The coefficient may be provided in system information (e.g., dedicated message, the common system information, system information for specific service type and/or specific random access purpose, broadcasted system information for specific numerology, . . . ) or predefined or UE-self detected (e.g., UE detects based on reference signals from network and defined table). Alternatively, the broadcast message is a system information for specific service type and/or specific random access purpose as Msg1 discrimination mentioned in issue part or for any selection rule mentioned below.

In another embodiment, the RAR window start timing is provided to UE through a dedicated message (e.g., RRC reconfiguration message, paging message, PDCCH for initiating RA, . . . ). In one embodiment, the dedicated message is a configuration message. The dedicated message may be a response message to UE's request. In one embodiment, the configuration provided in dedicated message is used to overwrite configuration provided in broadcast message.

Alternatively, the configuration provided in dedicated message provides more information without overwriting configuration provided in broadcast message. In one embodiment, the configuration may contain Msg1 resource set(s). In one embodiment the configuration may contain RAR window start timing(s). Possibly, the dedicated message information may use a value to indicate RAR window start timing. And the real RAR window start timing will need to multiply the value with a coefficient. The coefficient may be provided in system information (e.g., the dedicated message, common system information, system information for specific service type and/or specific random access purpose, broadcasted system information for specific numerology, . . . ) or predefined or UE-self detected (e.g., UE detects based on reference signals from network and defined table).

In another embodiment, the RAR window start timing is predefined in the specification (e.g., default configuration). The specification will include different window start timings for different physical layer configurations (e.g., different numerologies, TTI length of Msg1, TTI length of Msg2, frequency carrier, guard period(s) of Msg1, . . . ). For example, each format of Msg1 will have corresponding RAR window start timing. As another example, different numerologies used for Msg2 transmission may have different RAR window start timings.

If a UE have more than one RAR window length and/or RAR window start timing, the UE will select RAR window length and RAR window start timing based on one or multiple consideration(s) mentioned below. Consideration for selecting RAR window length and RAR window start timing could be the same or different.

In one embodiment, the UE selects RAR window information based on its Msg1 transmission (e.g., preamble set in RA configuration used by Msg1, PRACH resource set in RA configuration used by Msg1, Msg1 length or format, RA configuration used by Msg1, etc.). In one embodiment, the UE selects RAR window information based on service types (e.g., URLLC, eMBB, delay sensitive, . . . ). For example, if the UE triggers RA for transmitting a specific service type data (e.g., URLLC service type), then the UE will select RAR window information for the specific service type. Moreover, the UE may understand the data belonging to which service type based on a service type indication (similar to logical channel priority) in configuration of logical channel/RB having data available for transmission. The service type indication may be used in multiplexing procedure. For instance, the UE may not multiplex data with different service type indications into a TB for transmission.

Alternatively, the UE may understand the data belonging to which service type based on header field of the data (e.g., RLC header field, PDCP field). Alternatively, the UE may understand the data belonging to which service type based on delivering user plane protocol type/category (e.g., category 1 maps to URLLC). As another example, if the UE triggers RA when the UE has registered/authorized for URLLC service type, the UE will select RAR window information for URLLC service type. As another example, if higher layer (e.g., NAS layer, application layer, RRC layer) in a UE sends a service indication to lower layer (e.g., MAC, PHY) in the UE when the UE triggers and/or performs RA, the UE will select RAR window information based on the service type indicated by the service indication.

In one embodiment, the UE selects RAR window information based on random access purpose (e.g., request system information, paging, positioning, location update, control plane establishment, handover, etc.). And the random access purpose may be indicated by higher layer (e.g. NAS, RRC, application layer) in the UE. In one embodiment, the UE selects RAR window information based on potential Msg3 size. For example, if the pending data available for transmission in a UE larger than a threshold when a UE is performing RA, the UE selects RAR window information for potential message size larger than the threshold.

In one embodiment, the UE selects RAR window information based on its DL measurement. In one embodiment, the UE selects RAR window information based on connection establishment cause (e.g., emergency call, mo-data, mt-data, . . . ). In one embodiment, the UE selects RAR window information based on its current power ramping result. In one embodiment, the UE selects RAR window information based on UE priority provided from network or UE subscription. In one embodiment, the UE selects RAR window information based on Msg3 contents (e.g., which type control element will be included, BSR reporting for which LCG or which RB/LC, data from which user plane protocol stock, data from which radio bearer, data from which logical channel, . . . ). For example, if Msg3 will include data from a specific (set of) LC or RB (e.g., URLLC type RB, CCCH (Common Control Channel), . . . ), the UE will select RAR window information related to the LC or RB based on the UE's configuration.

As another example, if Msg3 will include a special control element/special message, the UE will select RAR window information related to the special control element/message. In one embodiment, the UE selects RAR window information based on highest priority of radio bearers having data available for transmission. For example, the UE has data available for transmission belonging to radio bearer with priority 2 and priority 8 when the UE is performing RA. The UE will select RAR window information based on whether priority 2 is over a threshold or not.

In one embodiment, the UE selects RAR window information based on highest priority of logical channels having data available for transmission. In one embodiment, the UE selects RAR window information based on which user plane protocol stock (e.g., URLLC or eMBB type user plane protocol, protocol stock category/index 1 or 2, . . . ) performing the random access.

In addition, the present application further considers how to design back-off mechanism for satisfying different latency requirements for different UEs.

Back-off—The Back-off indicator is used to distribute UEs failed in contention into different contention opportunities based on congestion levels. Regarding back-off indicator (back-off interval values), it could be important factor for affecting the random access latency. Hence, to improve random access latency, especially for URLLC, the back-off indicator design needs to be carefully reviewed.

Figure 16:
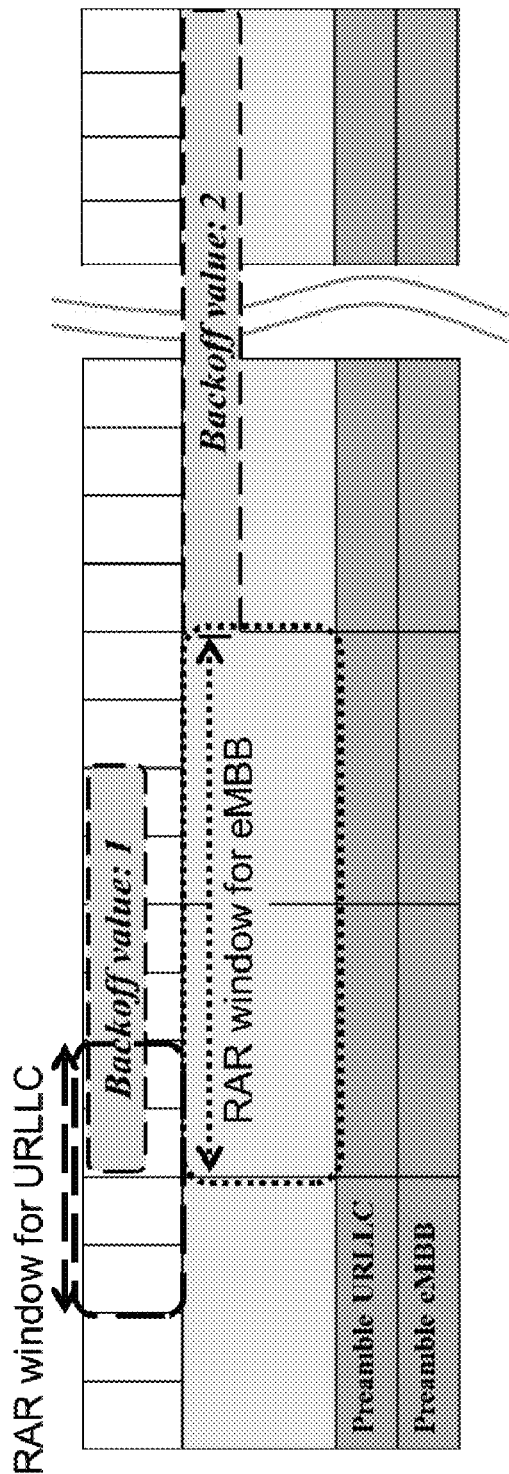
FIG. 16 is a diagram according to one exemplary embodiment.

It could be beneficial for network to provide different back-off interval values (e.g., value in BI field of MAC header) and/or scales (e.g., different reference tables) and/or start offset for different needs (e.g., associated with Msg1, associated with service types, establishment causes, . . . ). An example is shown in FIG. 16. In FIG. 16, start offset and back-off values are set differently for URLLC service type and eMBB service type.

More specifically, the different scales mean different back-off time intervals (e.g. time interval for random selecting) for the same back-off value. In one embodiment, the scale of back-off may be times of TTI duration on the numerology used to transmit Msg2. Alternatively, the scale of back-off may be times of interval between Msg1 transmission opportunities or times of sub-frames.

Regarding the start offset, the start offset may be provided through broadcast message (e.g., system information). Alternatively, the start offset may be provided through back-off information. The start offset design to let UE enter back-off earlier or later. One possible usage is for forcing UE to enter back-off earlier if network decides not to provide Msg2 for a RA-RNTI in following opportunities. Another possible usage could be that network prioritizes some random access procedure by delaying the back-off timing of other random access procedures.

The back-off information may include at least the following information:
1. Back-off interval value(s)
2. Start offset(s)
3. Granularity of back-off interval(s) (e.g., unit: X subframe, 5 ms, 2 times of Msg2 TTI, 10 times of Msg1 TTI, . . . )
4. Granularity of start offset(s) (e.g., unit: subframe, ms, Msg2 TTI, Msg1 TTI, . . . )

Note: The different back-off information in the same TB may be provided for different Msg1 resource set by implicit way or explicit way (e.g., Msg1 resource set indication(s), service type indication(s), random purpose indication(s)).

Possibly, the real back-off interval may be derived based on a predefined table. The table may include mapping between back-off interval value (e.g., index value) and real back-off interval. Alternatively, the real back-off interval may be Back-off interval value multiplied with granularity of back-off interval. Alternatively, the real back-off interval may be derived based on two steps procedure. The Back-off interval value will be translated to another value based on a table. The table may include mapping between back-off interval value and another value. And the another value will multiply with granularity of back-off interval for obtaining real back-off interval. For multiplying granularity alternatives, the network may be able to provide single value to achieve different back-off intervals.

Possibly, the real start offset may be derived based on a predefined table. The table may include mapping between an index value and a start offset. Alternatively, the real start offset may be a value multiplied with granularity of start offset. Alternatively, the real start offset may be derived based on two steps procedure. The value indicated by network will be translated to another value based on a table. And the another value will multiply with granularity of start offset for obtaining real start offset. For multiplying granularity alternatives, the network may be able to provide single value to achieve different start offset.

Back-off Information Transmitted with RAR

Independent Msg2 case—If different Msg2 messages for responding different Msg1 resource sets are transmitted based on different physical layer configurations (e.g., RA-RNTI based on different RA-RNTI formula, time/frequency resource, . . . ) and will not be received and successfully decoded by UEs using different Msg1 resource sets, the back-off information in Msg2 messages for responding different Msg1 resource sets can be interpreted in different granularity of time scale (e.g., back-off value 1 means 5 ms back-off interval for Msg1 resource set 1 and 10 ms back-off interval for Msg1 resource set 2) or can be set to different values for different Msg1 resource sets. A UE will depend on Msg1 resource set it used to monitor Msg2 and follow received back-off information. Moreover, different values may be provided to different Msg1 resource sets depending on congestion level in each Msg1 resource set.

Figure 17:
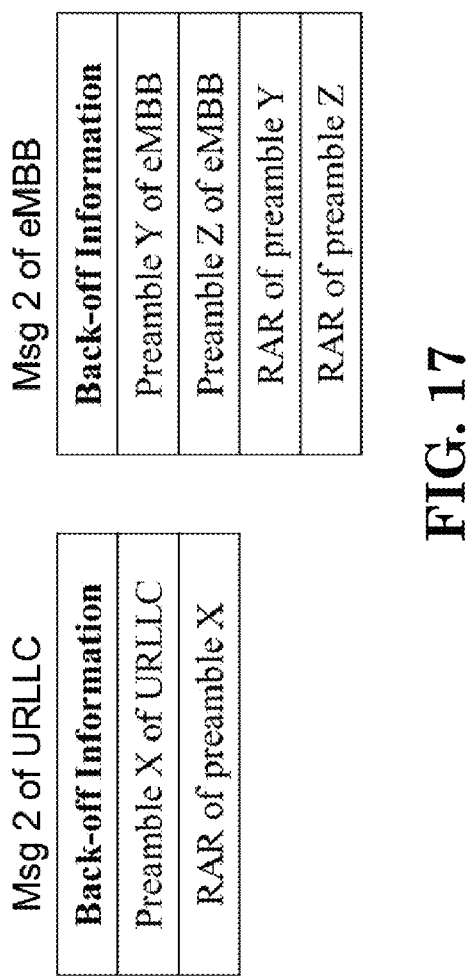
FIG. 17 is a diagram according to one exemplary embodiment.

As an example for above description, if a UE uses Msg1 resource set related to URLLC to transmit Msg1, the UE will not receive and successfully decode the Msg2 of eMBB in FIG. 17, when it is monitoring Msg2 for responding its Msg1 transmission. Furthermore, if the UE receives the Msg2 of URLLC in FIG. 17, the UE will follow the back-off information field to perform back-off.

Regarding different physical layer configurations for separately transmitting Msg2, one possible way is that UEs using different Msg1 resource sets will monitor Msg2 on different time and/or frequency radio resources. The radio resource information for monitoring Msg2 may be indicated through system information and/or dedicated signalling (e.g., for overwriting broadcast system information, for providing more information for other reason). Alternatively, the radio resource information for monitoring Msg2 may be predefined. And the radio resource information may include different offsets for calculating the start frequency and/or time point for monitoring Msg2 for separation.

In one embodiment, the radio resource information may include mask for filtering available monitoring resource for different cases. In another embodiment, Msg2 will be addressed to different identifiers for separation. In this case, new formula for calculating identifiers (e.g., RA-RNTI) may be needed. The new formula may take purpose of random access/service types mentioned in the issue part or for any selection rule mentioned below into account. For example, different service types have different corresponding index values. And the index will be used in the formula for calculating the identifiers (e.g., identifier=A×time_id+B×frequency_id+C×service type_id).

Figure 18:
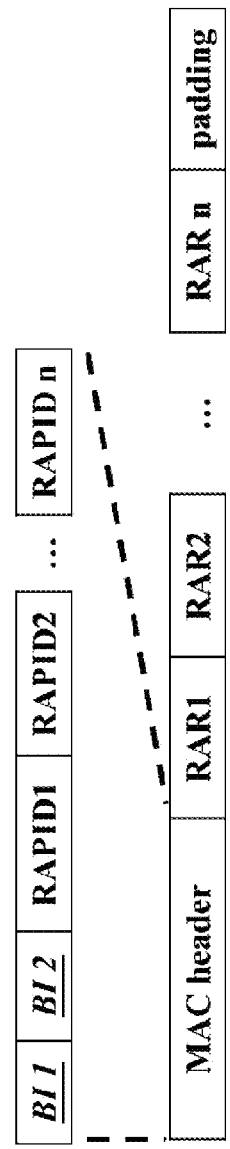
FIG. 18 is a diagram according to one exemplary embodiment.

Shared Msg2 case—If Msg2 for responding different Msg1 resource sets can be received and successfully decoded by UEs using different Msg1 resource sets, one possible solution may be provide different back-off indicators in a Msg2 (e.g., one for URLLC, one for eMBB). The UE select one of them to follow based on Msg1 resource set used by the UE. A possible example is shown in FIG. 18. In the case shown in FIG. 18, a UE may select BI1 to perform back-off mechanism if the UE uses a first Msg1 resource set (e.g. preamble group 1, PRACH resource set 1, etc.). Otherwise, the UE will select the BI2 to perform back-off mechanism.

Another possible solution is that let RARs for different Msg1 resource sets be transmitted in different Msg2 and carry different BI values in Msg2 for different Msg1 resource sets. In this case, although a UE can receive multiple Msg2, the UE can select appropriate BI value to follow based on Msg1 resource sets used by the UE. For instance, if an UE uses Msg1 resource set for URLLC and receives the two Msg2 messages in FIG. 17, the UE will use back-off indicator in left-hand side Msg2 for performing back-off.

Figure 19:
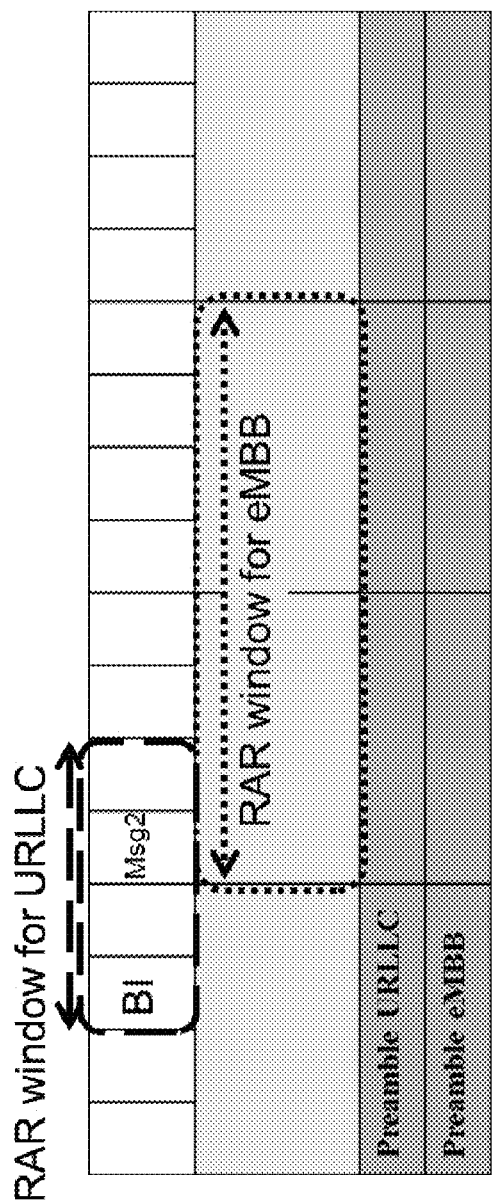
FIG. 19 is a diagram according to one exemplary embodiment.

Back-off information is independently transmitted without RAR—One possible example for back-off information is independently transmitted without RAR is shown in FIG. 19. Regarding this case, solutions proposed above can also be applied. The Msg2 mentioned above can be replaced with a transport block containing back-off information, except with the last solution. Moreover, the granularity of back-off interval can also be provided to a UE through other ways.

In one embodiment, the granularity of back-off interval can be provided through a broadcast message (e.g., common system information, system information for specific service type and/or specific random access purpose, broadcasted system information for specific numerology, MIB, . . . ) from a network. In another embodiment, the granularity of back-off interval is provided through dedicated message from a network (e.g., RRC reconfiguration message, paging message, PDCCH for initiating RA, . . . ). In another embodiment, the granularity of back-off interval is decided based on TTI length used on Msg2 transmission. In another embodiment, the granularity of back-off interval is decided based on TTI length used on Msg1 transmission.

The different granularities can be provided for any discrimination mentioned in issue part or for any selection rule mentioned below through one or multiple means mentioned above. If a UE has more than one granularities information and/or back-off interval value, the UE will select one of them to follow based on one or multiple consideration mentioned below. The granularities information and back-off interval value can select based on the same or different considerations.

Note: the granularity of back-off offset can be derived as similar way mentioned for deriving the granularity of back-off interval.

In one embodiment, the UE selects back-off information based on its Msg1 transmission (e.g., preamble set in RA configuration used by Msg1, PRACH resource set in RA configuration used by Msg1, Msg1 length or format, RA configuration used by Msg1, etc.). In one embodiment, the UE selects back-off information based on service types (e.g., URLLC, eMBB, delay sensitive, . . . ). For example, if the UE triggers RA for transmitting a specific service type data (e.g., URLLC service type), then the UE will select back-off information for the specific service type. Moreover, the UE may understand the data belonging to which service type based on a service type indication (similar to logical channel priority) in configuration of logical channel/RB having data available for transmission.

The service type indication may be used in multiplexing procedure. For instance, the UE may not multiplex data with different service type indications into a TB for transmission. Alternatively, the UE may understand the data belonging to which service type based on header field of the data (e.g., RLC header field, PDCP field). Alternatively, the UE may understand the data belonging to which service type based on delivering user plane protocol type/category (e.g., category 1 maps to URLLC). As another example, if the UE triggers RA when the UE has registered/authorized for URLLC service type, the UE will select back-off information for URLLC service type. As yet another example, if higher layer (e.g., NAS layer, application layer, RRC layer) in a UE sends a service indication to lower layer (e.g., MAC, PHY) in the UE when the UE triggers and/or performs RA, the UE will select RAR window information based on the service type indicated by the service indication.

In one embodiment, the UE selects back-off information based on random access purpose (e.g., request system information, paging, positioning, location update, control plane establishment, handover, etc.). And the random access purpose may be indicated by higher layer (e.g., NAS, RRC, application layer) in the UE.

In one embodiment, the UE selects back-off information based on potential Msg3 size. For example, if the pending data available for transmission in a UE larger than a threshold when a UE is performing RA, the UE selects back-off information for potential message size larger than the threshold.

In one embodiment, the UE selects back-off information based on its DL (Downlink) measurement. In one embodiment, the UE selects back-off information based on connection establishment cause (e.g., emergency call, mo-data, mt-data, . . . ). In one embodiment, the UE selects back-off information based on its current power ramping result. In one embodiment, the UE selects back-off information based on UE priority provided from network or UE subscription.

In one embodiment, the UE selects back-off information based on Msg3 contents (e.g., which type control element will be included, BSR reporting for which LCG or which RB/LC, data from which user plane protocol stock, data from which radio bearer, data from which logical channel, . . . ). For example, if Msg3 will include data from a specific (set of) LC or RB (e.g., URLLC type RB, CCCH, . . . ), the UE will select back-off information related to the LC or RB based on the UE's configuration. As another example, if Msg3 will include a special control element/special message, the UE will select back-off information related to the special control element/message.

In one embodiment, the UE selects back-off information based on highest priority of radio bearers having data available for transmission. For example, the UE has data available for transmission belonging to radio bearer with priority 2 and priority 8 when the UE is performing RA. The UE will select back-off information based on whether priority 2 is over a threshold or not.

In one embodiment, the UE selects back-off information based on highest priority of logical channels having data available for transmission. In one embodiment, the UE selects back-off information based on which user plane protocol stock (e.g., URLLC or eMBB type user plane protocol, protocol stock category/index 1 or 2, . . . ) performing the random access.

Figure 20:
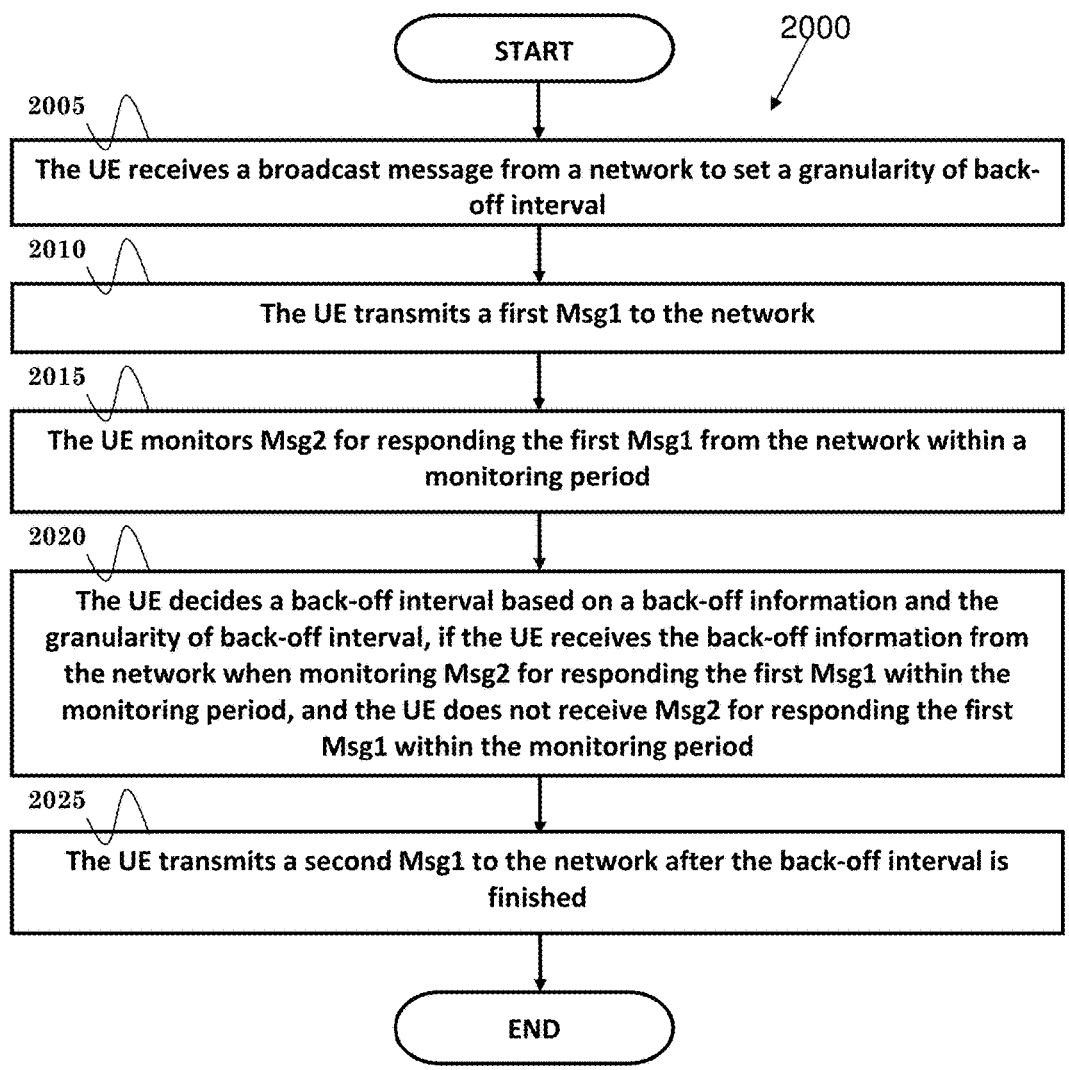
FIG. 20 is a flow chart according to one exemplary embodiment.

FIG. 20 is a flow chart 2000 according to one exemplary embodiment from the perspective of a UE. In step 2005, the UE receives a broadcast message from a network to set a granularity of back-off interval. In step 2010, the UE transmits a first Msg1 to the network. In step 2015, the UE monitors Msg2 for responding the first Msg1 from the network within a monitoring period. In step 2020, the UE decides a back-off interval based on a back-off information and the granularity of back-off interval, if the UE receives the back-off information from the network when monitoring Msg2 for responding the first Msg1 within the monitoring period, and the UE does not receive Msg2 for responding the first Msg1 within the monitoring period. In step 2025, the UE transmits a second Msg1 to the network after the back-off interval is finished.

Referring back to FIGS. 3 and 4, in one exemplary embodiment of a UE, the device 300 includes a program code 312 stored in the memory 310. The CPU 308 could execute program code 312 to enable the UE (i) to receive a broadcast message from a network to set a granularity of back-off interval, (ii) to transmit a first Msg1 to the network, (iii) to monitorMsg2 for responding the first Msg1 from the network within a monitoring period, (iv) to decide a back-off interval based on a back-off information and the granularity of back-off interval, if the UE receives the back-off information from the network when monitoring Msg2 for responding the first Msg1 within the monitoring period, and the UE does not receive Msg2 for responding the first Msg1 within the monitoring period, and (v) to transmit a second Msg1 to the network after the back-off is finished. Furthermore, the CPU 308 can execute the program code 312 to perform all of the above-described actions and steps or others described herein.

Figure 21:
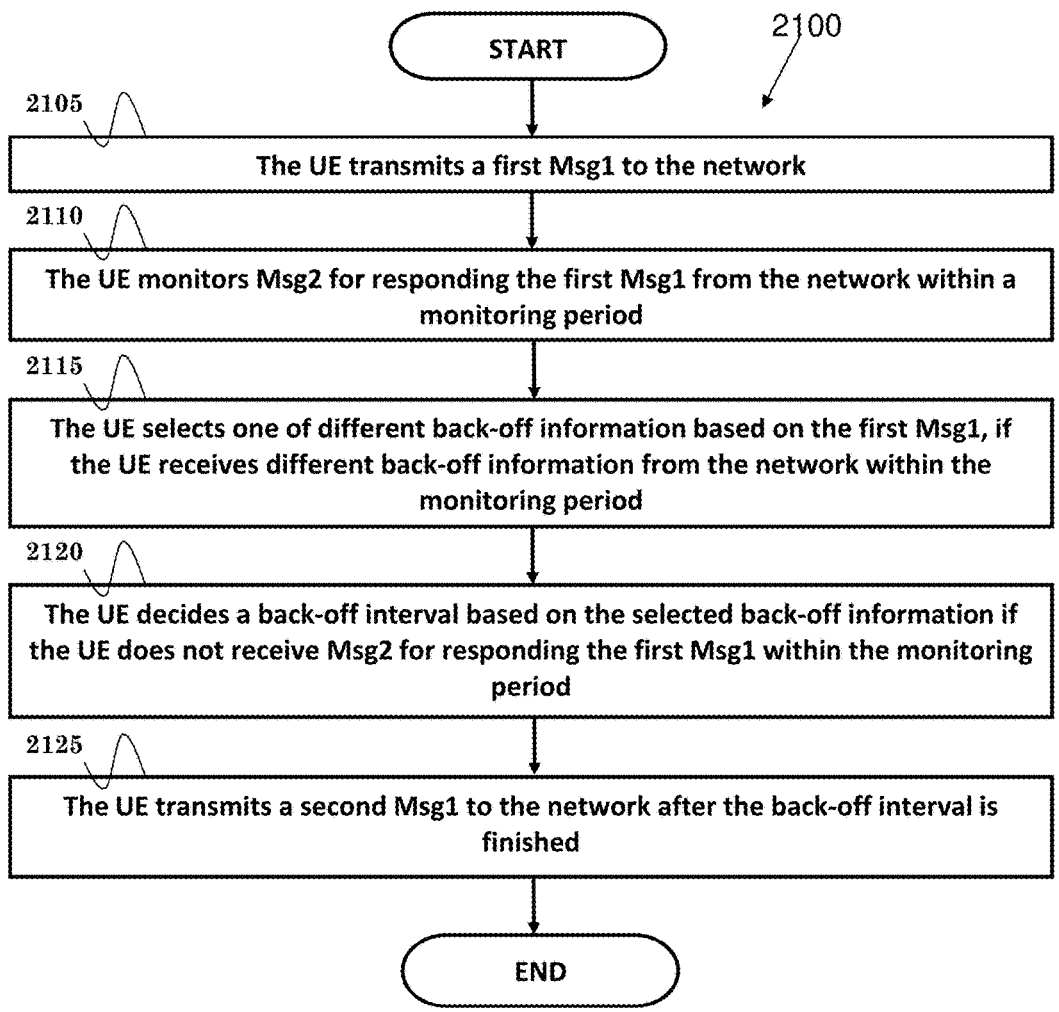
FIG. 21 is a flow chart according to one exemplary embodiment.

FIG. 21 is a flow chart 2100 according to one exemplary embodiment from the perspective of a UE. In step 2105, the UE transmits a first Msg1 to the network. In step 2110, the UE monitors Msg2 for responding the first Msg1 from the network within a monitoring period. In step 2115, the UE selects one of different back-off information based on the first Msg1, if the UE receives different back-off information from the network within the monitoring period.

In one embodiment, at least one of the different back-off information is carried in different Msg2 messages. In another embodiment, more than one of the different back-off information are carried in one Msg2. In another embodiment, at least one of the different back-off information are carried in a transport block which doesn't including RAR. In one embodiment, the UE selects back-off information in a Msg2 including response for a third Msg1, wherein the third Msg1 and the first Msg1 belong to the same Msg1 set.

In one embodiment, the selected back-off information could include a back-off interval value. The selected back-off information could also include a start offset of back-off interval. Furthermore, the selected back-off information could include a granularity of back-off interval and/or a granularity of a start offset of back-off interval.

In one embodiment, the back-off information could include a back-off interval value and/or a back-off start offset.

In step 2120, the UE decides a back-off interval based on the selected back-off information if the UE does not receive Msg2 for responding the first Msg1 within the monitoring period. In step 2125, the UE transmits a second Msg1 to the network after the back-off interval is finished.

Referring back to FIGS. 3 and 4, in one exemplary embodiment of a UE, the device 300 includes a program code 312 stored in the memory 310. The CPU 308 could execute program code 312 to enable the UE (i) to transmit a first Msg1 to the network, (ii) to monitor Msg2 for responding the first Msg1 from the network within a monitoring period, (iii) to select one of different back-off information based on the first Msg1 if the UE receives different back-off information from the network within the monitoring period, (iv) to decide a back-off interval based on the selected back-off information if the UE does not receive Msg2 for responding the first Msg1 within the monitoring period, and (v) to transmit a second Msg1 to the network after the back-off is finished. Furthermore, the CPU 308 can execute the program code 312 to perform all of the above-described actions and steps or others described herein.

Figure 25:
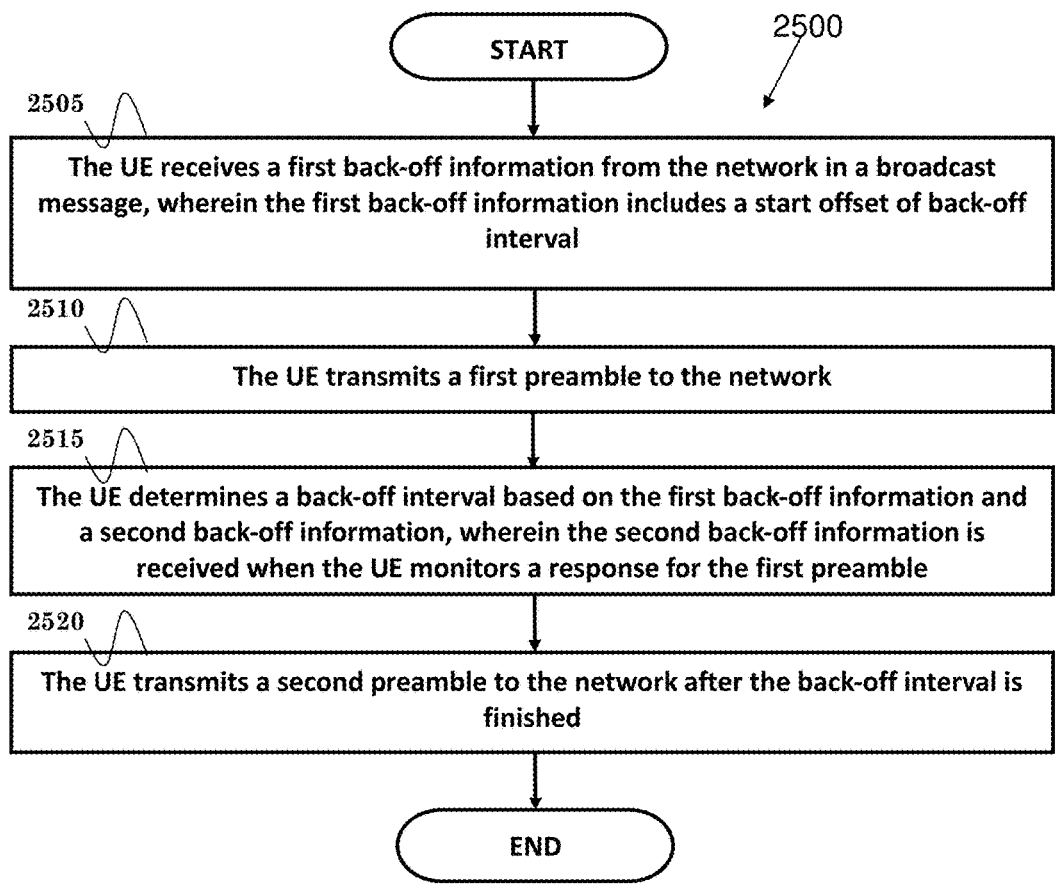
FIG. 25 is a flow chart according to one exemplary embodiment.

FIG. 25 is a flow chart 2500 according to one exemplary embodiment from the perspective of a UE. In step 2505, the UE receives a first back-off information from the network in a broadcast message, wherein the first back-off information includes a start offset of back-off interval. In one embodiment, the first back-off information could include a granularity information.

In one embodiment, the UE could select the first back-off information based on a resource set of the first preamble if the broadcast message includes multiple back-off information. The UE could also select the first back-off information based on a purpose of the random access procedure. In addition, the UE could select the first back-off information based on highest priority logical channel in all logical channels with data available for transmission.

In step 2510, the UE transmits a first preamble to the network. In step 2510, the UE determines a back-off interval based on the first back-off information and a second back-off information, wherein the second back-off information is received when the UE monitors a response for the first preamble. In one embodiment, the second back-off information could include a back-off indicator.

In one embodiment, the UE could select the second back-off information based on a resource set of the first preamble, if the UE receives multiple back-off information when the UE monitors the response for the first preamble. Furthermore, the UE could select the second back-off information based on a purpose of the random access procedure, if the UE receives multiple back-off information when the UE monitors the response for the first preamble. In addition, the UE could select the second back-off information based on highest priority logical channel in all logical channels with data available for transmission, if the UE receives multiple back-off information when the UE monitors the response for the first preamble.

In step 2515, the UE transmits a second preamble to the network after the back-off interval is finished. In one embodiment, the UE could determine the back-off interval based on a first value derived from multiplying the granularity information in the first back-off information by the back-off indicator in the second back-off information. The UE could also determine the back-off interval based on a first value derived from multiplying the granularity information in the first back-off information by a second value derived based on the back-off indicator in the second back-off information. Furthermore, the UE could determine the back-off interval if the UE doesn't receive the response for the first preamble.

In one embodiment, the purpose of the random access procedure could be for requesting system information. Alternatively, the purpose of the random access procedure could be for control plane establishment. Also, the purpose of the random access procedure could be for handover.

Referring back to FIGS. 3 and 4, in one exemplary embodiment of a UE, the device 300 includes a program code 312 stored in the memory 310. The CPU 308 could execute program code 312 to enable the UE (i) to receive a first back-off information from the network in a broadcast message, (ii) to transmits a first preamble to the network, (iii) to determine a back-off interval based on the first back-off information and a second back-off information, wherein the second back-off information is received when the UE monitors a response for the first preamble, and (iv) to transmit a second preamble to the network after the back-off interval is finished. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment) for performing random access procedure, comprising:
the UE receives a first back-off information from a first base station in a dedicated message, wherein the first back-off information includes a granularity information;
the UE transmits a first preamble to a second base station;
the UE determines a back-off interval based on the first back-off information and a second back-off information, wherein the second back-off information is received when the UE monitors a response for the first preamble; and
the UE transmits a second preamble to the second base station after a back-off time, wherein the back-off time is randomly selected within the back-off interval.

2. The method of claim 1, wherein the first back-off information includes a start offset of back-off interval.

3. The method of claim 1, wherein the second back-off information includes a back-off indicator.

4. The method of claim 1, further comprising:
the UE selects the first back-off information based on a resource set of the first preamble, if the dedicated message includes multiple back-off information.

5. The method of claim 1, further comprising:
the UE selects the first back-off information based on a purpose of the random access procedure.

6. The method of claim 1, further comprising:
the UE selects the first back-off information based on highest priority logical channel in all logical channels with data available for transmission.

7. The method of claim 1, further comprising:
the UE selects the second back-off information based on a resource set of the first preamble, if the UE receives multiple back-off information when the UE monitors the response for the first preamble.

8. The method of claim 1, further comprising:
the UE selects the second back-off information based on a purpose of the random access procedure, if the UE receives multiple back-off information when the UE monitors the response for the first preamble.

9. The method of claim 1, further comprising:
the UE selects the second back-off information based on highest priority logical channel in all logical channels with data available for transmission, if the UE receives multiple back-off information when the UE monitors the response for the first preamble.

10. The method of claim 5, wherein the purpose of the random access procedure is requesting system information.

11. The method of claim 5, wherein the purpose of the random access procedure is for control plane establishment.

12. The method of claim 5, wherein the purpose of the random access procedure is for handover.

13. The method of claim 2, further comprising:
the UE determines the back-off interval based on multiplying the granularity information in the first back-off information by the back-off indicator in the second back-off information.

14. The method of claim 2, further comprising:
the UE determines the back-off interval based on multiplying the granularity information in the first back-off information by a second value derived from the back-off indicator in the second back-off information.

15. The method of claim 1, further comprising:
the UE determines the back-off time if the UE does not receive the response for the first preamble.

16. The method of claim 1, wherein the first base station and the second base station are different base stations.

17. The method of claim 1, wherein the first base station and the second base station are the same base station.

18. The method of claim 1, wherein the granularity information includes a granularity of the back-off interval.

19. The method of claim 1, wherein the granularity information includes a granularity of the start offset of back-off interval.

20. The method of claim 1, wherein the dedicated message is a RRC (Radio Resource Control) reconfiguration message.

21. A User Equipment (UE) for performing random access procedure, comprising:
a control circuit;
a processor installed in the control circuit; and
a memory installed in the control circuit and operatively coupled to the processor;
wherein the processor is configured to execute a program code stored in the memory to:
receive a first back-off information from a first base station in a dedicated message, wherein the first back-off information includes a granularity information;
transmit a first preamble to a second base station;
determine a back-off interval based on the first back-off information and a second back-off information, wherein the second back-off information is received when the UE monitors a response for the first preamble; and
transmit a second preamble to the second base station after a back-off time, wherein the back-off time is randomly selected within the back-off interval.

* * * * *